(12) United States Patent
Young et al.

(10) Patent No.: US 7,917,838 B2
(45) Date of Patent: Mar. 29, 2011

(54) ENHANCED HUMAN COMPUTER USER INTERFACE SYSTEM FOR SEARCHING AND BROWSING DOCUMENTS

(76) Inventors: Cory Young, Provo, UT (US); David Kovanen, Browns Point, WA (US); Joseph Fullmer, Orem, UT (US)

( * ) Notice: Subject to any disclaimer, the term of this patent is extended or adjusted under 35 U.S.C. 154(b) by 1050 days.

(21) Appl. No.: 11/513,323

(22) Filed: Aug. 31, 2006

(65) Prior Publication Data

US 2007/0050385 A1 Mar. 1, 2007
US 2008/0010303 A9 Jan. 10, 2008

Related U.S. Application Data

(63) Continuation of application No. 11/491,486, filed on Jul. 24, 2006, now Pat. No. 7,770,099, which is a continuation of application No. 09/691,076, filed on Oct. 18, 2000, now Pat. No. 7,082,567.

(60) Provisional application No. 60/160,243, filed on Oct. 18, 1999.

(51) Int. Cl.
*G06F 17/00* (2006.01)
(52) U.S. Cl. .................. 715/201; 715/209; 707/821
(58) Field of Classification Search .................. None
See application file for complete search history.

(56) References Cited

U.S. PATENT DOCUMENTS 5,230,072 A 7/1993 Smith et al.
5,418,946 A 5/1995 Mori (Continued)

OTHER PUBLICATIONS

Murray et al.,"Encyclopedia of Graphics File Formats, 2nd Edition," published © Apr. 1996, O'Reilly & Associates, Inc., printouts of Chapter 3. Bitmap Files, TIFF File Format Summary, and TGA File Format Summary, downloaded from <"http://netghost.narod.ru/gff/">, pages numbered 1-81 totaling 81 pages.*

(Continued)

*Primary Examiner* — Doug Hutton
*Assistant Examiner* — James H Blackwell
(74) *Attorney, Agent, or Firm* — Sterne, Kessler, Goldstein & Fox PLLC

(57) ABSTRACT

A system and method for presenting document records to a user through a display interface, comprising means for processing data of the first type through a first applet and data of the second type through a second applet and separately extracting data of the two different types using the separate applets. The user interface provides means for selecting a data file from a plurality of data files, displaying the merged and formatted processed first and second data, and managing a plurality of data files with the host application. Each record on the list may be individually selected, comprising providing at least two distinct categorization inputs from the user, providing an indicia in the record list to indicate a respective record classification, and providing means for selectively processing the records according to a respective classification thereof. The data file employs a standard image format file with an embedded index pointer to segregate two data types. A first data type, preferably an image, is referenced by the index pointer and is located near the terminus of the file. A second data type, for example text, appears immediately after the file header which includes the index pointer, and preferably terminates with an end of file marker. Thus, the single file may be read by both a standard image file reader, and a standard text reader, without parsing or segregation. The two data types are preferably text and image data, and the data file is preferably a tagged image format file (TIFF) file with Group-4 image compression.

18 Claims, 18 Drawing Sheets

U.S. PATENT DOCUMENTS

| | | | |
|---|---|---|---|
| 5,457,776 A * | 10/1995 | Wong et al. | 715/234 |
| 5,539,908 A * | 7/1996 | Chen et al. | 719/331 |
| 5,636,631 A * | 6/1997 | Waitz et al. | 600/437 |
| 5,689,669 A | 11/1997 | Lynch et al. | |
| 5,819,295 A | 10/1998 | Nakagawa et al. | |
| 5,940,844 A * | 8/1999 | Cahill et al. | 715/268 |
| 5,966,718 A | 10/1999 | Shibata | |
| 6,009,442 A | 12/1999 | Chen et al. | |
| 6,014,688 A * | 1/2000 | Venkatraman et al. | 709/206 |
| 6,070,167 A * | 5/2000 | Qian et al. | 707/102 |
| 6,161,107 A | 12/2000 | Stern | |
| 6,237,011 B1 | 5/2001 | Ferguson et al. | |
| 6,237,099 B1 | 5/2001 | Kurokawa | |
| 6,298,164 B1 * | 10/2001 | Suzuki et al. | 382/245 |
| 6,310,647 B1 * | 10/2001 | Parulski et al. | 348/231.99 |
| 6,366,899 B1 | 4/2002 | Kernz | |
| 6,507,858 B1 * | 1/2003 | Kanerva et al. | 715/234 |
| 6,624,909 B1 * | 9/2003 | Czyszczewski et al. | 358/1.17 |
| 6,633,893 B2 | 10/2003 | Yahara et al. | |
| 6,757,827 B1 | 6/2004 | Geist | |
| 7,039,856 B2 | 5/2006 | Peairs et al. | |
| 7,051,277 B2 | 5/2006 | Kephart et al. | |
| 7,082,567 B1 | 7/2006 | Young et al. | |
| 7,188,186 B1 * | 3/2007 | Meyer et al. | 709/231 |
| 7,271,832 B1 * | 9/2007 | Parulski et al. | 348/231.99 |
| 7,536,706 B1 * | 5/2009 | Sezan et al. | 725/113 |
| 7,644,374 B2 | 1/2010 | Wong et al. | |
| 2007/0050401 A1 | 3/2007 | Young et al. | |
| 2007/0179960 A1 | 8/2007 | Young et al. | |

OTHER PUBLICATIONS

Unknown author, "The TIFF Image File Format", Feb. 19, 1999, The Cooper Union for the Advancement of Science and Art, 42 pages total.

Hackbarth, "Tiffy View advertisement", 1999, downloaded from http://web.archive.org.web.19991106083855/http://www.tiffy.de/tiffye/Tiffy.html, 5 pages total.

Adobe Developers Association, "Tiff Rev. 6.0 Final specification", Jun. 3, 1992, Adobe, p. 20.

Microsoft Press, "Microsoft Press Computer Dictionary, 3rd Edition", 1997, Microsoft, p. 27.

* cited by examiner

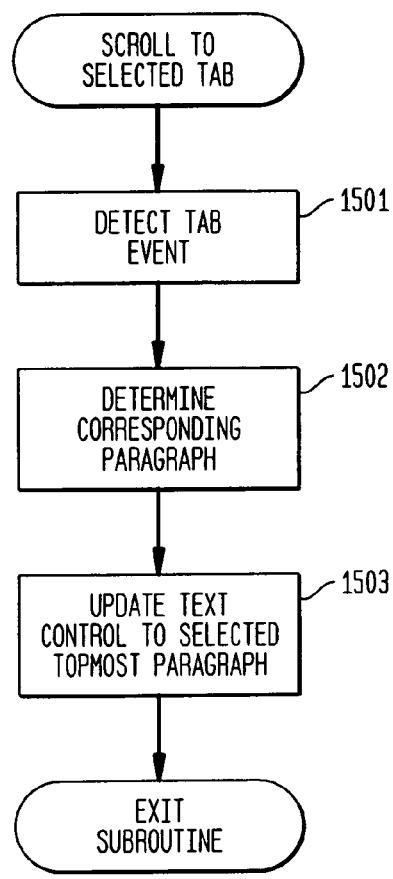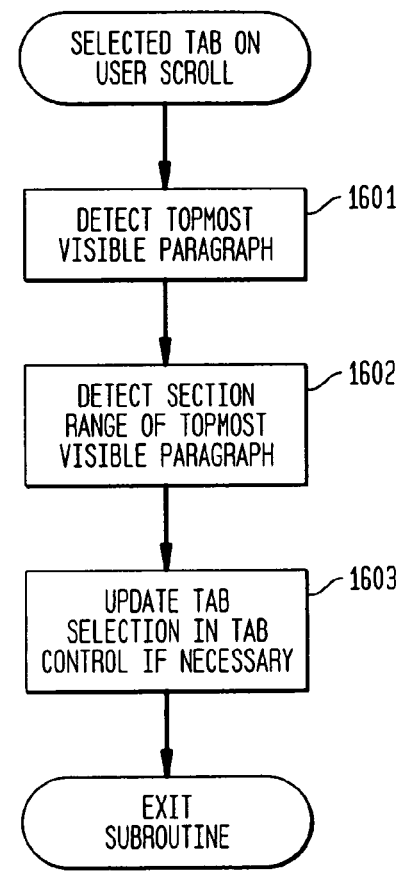

ENHANCED HUMAN COMPUTER USER INTERFACE SYSTEM FOR SEARCHING AND BROWSING DOCUMENTS

CROSS REFERENCE TO RELATED APPLICATIONS

This application is a Continuation of U.S. application Ser. No. 11/491,486 filed on Jul. 24, 2006, now U.S. Pat. No. 7,770,009 issued on Aug. 3, 2010, and entitled "ENHANCED HUMAN COMPUTER USER INTERFACE SYSTEM FOR SEARCHING AND BROWSING DOCUMENTS," the entire contents of which is incorporated by reference, and for which priority is claimed under 35 U.S.C. §120, which is a Continuation of U.S. application Ser. No. 09/691,076 filed on Oct. 18, 2000, now U.S. Pat. No. 7,082,567 B1 issued on Jul. 25, 2006, which claims priority under U.S.C. §119(e) to U.S. Provisional Application Ser. No. 60/160,243, filed on Oct. 18, 1999.

FIELD OF THE INVENTION

The present invention relates to the field of improved document browsers, and more particularly to an improved human computer user interface system and method for searching, browsing and selecting documents stored in a massive database having a relatively consistent format including graphics, defined fields, and large variable sized text object portions. The present invention also relates to the field of data file structures, and more particularly to data files combining both text and graphics.

BACKGROUND OF THE INVENTION

It is well known in the art to provide graphic interfaces for analyzing database search results. Further, browser systems are known which format and display both text and graphics. For example, the Folio Infobase system. Jouve S. A. GTI. and Dataware engines, as well as commercially deployed systems from Lexis/Nexis. Westlaw, MicroPatent LLC (assignee hereof), as well as many other proprietary and Internet based systems, provide such capabilities.

Typically, the graphic content of such documents is small or insignificant in comparison to the text, or the text and graphics are stored as separate file types. Systems that store text and compressed graphics in a single file, with user defined and/or intelligent control over display formatting at the client are not generally found.

It is also known to allow selection of a group of listed documents for later processing. However, the prior art typically does not allow the user to classify listed documents into a plurality of different classifications for selective processing according to the categorization.

It is well known in the art to provide data files having text and graphic data content. For example, popular word processing formats, Adobe PDF®, and other file types integrate text and graphics.

These formats, however, are proprietary, meaning that other software packages are typically unable to process types of data stored in the files. Thus, the data embedded in such composite data files is typically unavailable or partially unavailable to thin applets designed to deal with various standard data formats.

One alternative is to provide the data in two separate files, leading to certain difficulties in maintaining the relation between the two portions of the file. Likewise, a wrapper may be provided to encompass the pair of files in a single resulting file, such as by using the known ZIP format. However, this entails use of an additional applet.

SUMMARY AND OBJECTS OF THE INVENTION

The present invention provides a system and method for receiving a set of files, each potentially including text and compressed graphics, reading the text portion including embedded tags, decoding the graphic portion, and displaying the text and graphics on a computer screen in accordance with user preferences.

This is accomplished by providing index pointers within the file to identify the start of the compressed graphic with respect to the beginning of the file, thereby permitting text data to be placed before the designated offset. This arrangement is compatible with the known Group-4 compressed tagged image format file (TIFF) file. Thus, a known TIFF graphic processing module can directly operate on the file without modification.

The index pointer resides at the beginning of the file: therefore, a standard-type text processing tool can easily process these files without substantial manipulation. Thus, both text and compressed graphic can be directly extracted from a single file using separate application modules without physical parsing or duplication.

The text may be further indexed to provide further functions, such as selectable sections, text searching, or other known functions. According to a preferred embodiment, the text is divided into paragraphs, wherein selected paragraphs are addressable by tag. A user selectable tab corresponds to the address tag, facilitating navigation through the text.

The preferred embodiment also preferably provides an intelligent display formatter to control the display of the text in conjunction with the image. Based on the size of the image, the width and/or height of the displayed text are controlled. Further, the scaling of displayed images may also be controlled.

The user interface is controlled by a host application, which also functions to manage a plurality of data files, for example providing a list for the user to select from, and allowing the user to sort and subselect from the list.

The present invention provides a system and method for receiving a set of records, displaying the contents of the record, including e.g., text and graphics, on a computer screen, and allowing the user to categorize the records into at least three classes for later selective processing.

This is accomplished by providing a record list on a graphic user interface, in which each record on the list may be individually selected, providing at least two categorization inputs from the user, providing an indicia in the record list to indicate a respective record classification, and providing means for selectively processing the records according to a respective classification thereof.

The present invention also provides a data file system and method, the data file potentially including text and compressed graphics, which can be read by applets which are capable of reading standard file types. Essentially, the file format includes an offset pointer at a predetermined location, such as in the header of the file, which points to a first data type. The first data type is found in a latter portion of the file. The second data type resides after the header, and before the first data type, and ends with an end-of-file (EOF) marker. Therefore, the file may be read by a standard reader for the first data type, while the file may also be read by a reader for the second data type, possibly with an offset to avoid inclusion of the header information including the data pointer.

Thus, index pointers within the file identify the start of the compressed graphic with respect to the beginning of the file, thereby permitting text data to be placed before the designated offset. For example, the file type is a standard TIFF format, with the first data type being Group-4 compressed image and the second data type being ACSII or formatted text. (See, Adobe Corporation, TIFF 6.0 specification).

The index pointer resides at the beginning of the file; therefore, a standard-type text processing tool can easily process these files without substantial manipulation. Thus, both text and compressed graphic can be directly extracted from a single file using separate application modules without physical parsing or duplication.

The readers for the first and second data types may be controlled by a host application, which may also functions to manage a plurality of data files, for example providing a list for the user to select from, and allowing the user to sort and subselect from the list.

TIFF is an image file format. The largest possible TIFF file is $2^{32}$ bytes in length. A TIFF file begins with an 8-byte image file header that points to an image file directory (IFD). An image file directory contains information about the image, as well as pointers to the actual image data.

The TIFF specification provides for private fields and values. An organization might wish to store information meaningful to only that organization in a TIFF file. Tags numbered 32768 or higher, sometimes called private tags, are reserved for that purpose, and may be registered for exclusive use. TIFF tags in the "reusable" 65000-65535 range are available for use without registration, and are especially useful for closed environments. These tags, however, are not intended to facilitate a large data storage area within the TIFF file for storage of non-image data intended to be read by an application designed for a different file type.

The TIFF specification anticipates that new TIFF field types will appear. Therefore, one design criterion for readers is that they should skip over fields containing an unexpected field type. Each TIFF field has an associated Count. This means that all fields are actually one-dimensional arrays, even though most fields contain only a single value. For example, to store a complicated data structure in a single private field, an "undefined" type is established and the Count set to the number of bytes required to hold the data structure.

The Tagged Image File Format has a header which is defined as follows:

| Offset | Length | Description |
|--------|--------|-------------|
| 0 | 2 | Byte Order: MM or II |
| 2 | 2 | "Version Number", this is always 42 for TIFF images |
| 4 | 4 | Pointer to the first IFD |

The byte order refers to the endian used in the file, and is a two-letter ACSII record being either MM or II (4D4D hex or 4949 hex) referring to Motorola or Intel architecture. The version number 42 identifies the file as being a TIFF file. The IFD pointer is a 4 bytes value that is an offset from the start of the file and points to the first IFD that are explained below. Objects within the file are typically referenced with pointers.

Within the image file, directories are defined in the following manner:

| Offset | Length | Description |
|--------|--------|-------------|
| 0 | 2 | Entry Count |
| 2 | 12 | Entry 0 |
| 14 | 12 | Entry 1 |
| . | . | . |
| . | . | . |
| . | . | . |
| n * 12 + 2 | 12 | Entry n |
| n * 12 + 4 | 4 | Pointer to subsequent IFD or 0000 |

These directory entries are 12 byte data records that store the relevant specifications on the image stored. The size, compression, colors used, a table of pointers showing the raster data location and other parameters of the image. Before the IFD proper, a 2-byte value is provided indicating the number of IFD's present in the file. Then the IFD's are consecutively provided after the count.

Each IFD entry is formatted as follows:

| Offset | Length | Description |
|--------|--------|-------------|
| 0 | 2 | Tag |
| 2 | 2 | Type of Data |
| 4 | 4 | Count Field |
| 8 | 4 | Data Pointer or Data Field |

The first two bytes are a tag, identifying what the directory entry is about. The "Data Type" indicates the type of the data stored in this entry. The Count field specifies the number of values stored and not the number of bytes stored. The final 4 bytes store either a pointer to the location of the data, or, if the data can fit in 4 bytes, then the data itself is here.

It is therefore an object of the invention to provide a system and method for manipulating a record list, in which each record on the list may be individually selected, providing at least two distinct categorization inputs from the user, providing an indicia in the record list to indicate a respective record classification, and providing means for selectively processing the records according to a respective classification thereof.

It is also an object of the invention to provide a system and method for extracting data of a first type and a second type from a single file, comprising processing data of the first type through a first applet and data of the second type through a second applet the file inherently designates separate data storage regions.

It is a further object of the invention to provide a system and method for presenting document records to a user through a display interface, comprising the steps of analyzing a data file for the presence of data of a first type and a second type, processing data of the first type through a first applet and data of the second type through a second applet, merging and formatting the processed first and second data with a host application, displaying the merged and formatted processed first and second data.

These and other objects will become apparent from a review of the drawings and detailed description of the invention.

BRIEF DESCRIPTION OF THE DRAWINGS

The invention will now be described with reference to the accompanying drawings, in which:

FIG. 15 shows a logical flow chart for automatically scrolling the text to a section corresponding to a user-selected section tab;

FIG. 16 shows a logical flow chart for automatically selecting the tab that corresponds to the section that is currently visible on the display.

DESCRIPTION OF THE PREFERRED EMBODIMENT

The foregoing and other objects, features and advantages of the present invention will become more readily apparent to those skilled in the art to which the invention pertains upon reference to the following detailed description of one of the best modes for carrying out the invention, when considered in conjunction with the accompanying drawing in which preferred embodiments of the invention are shown and described by way of illustration, and not of limitation, wherein:

A preferred embodiment of the present invention provides a system and method for displaying a summary document from a document record on a graphic user interface (GUI) system. In general, the documents may be of a variety of types, however it is particularly preferred that they consist of a collection patents, defined by a collection criterion from the fullest of patent documents. As discussed below, the document file may have a particular format, and include image as well as text information.

Operating System and Tools

The present invention may be implemented in any suitable GUI-enabled operating system, such as Windows®. For purposes of illustrating the preferred embodiment, a solution using Windows® and Visual Basic® Professional 3.0 will be described.

File Format

The file format containing the information to be displayed is also arbitrary. For purposes of illustrating the preferred embodiment, a Group-4 compressed TIFF image file will be used.

The TIFF specification allows for modifications to the image header to accommodate additional proprietary data. Because the preferred embodiment displays summary document information consisting of an image, text, or both, the TIFF specification lends itself well to the implementation of the preferred embodiment.

Figure 1:
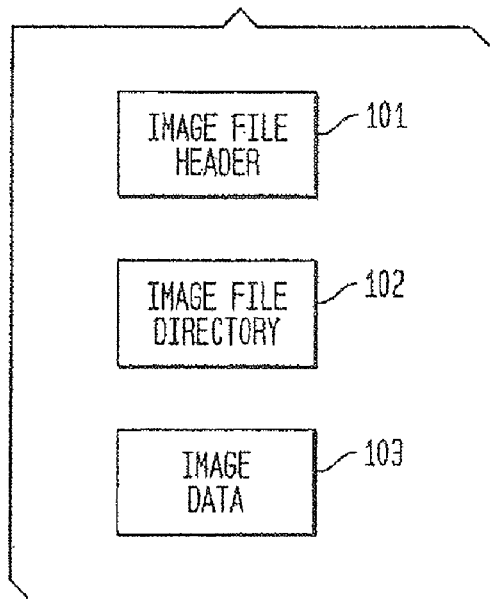
FIG. 1 is a schematic block diagram of a known image file.

FIG. 1 illustrates the typical layout of a TIFF file. The file starts with an Image File Header 101 that identifies it as being a TIFF file. The Image File Header also serves as a pointer to an Image File Directory 102, which contains information about the image as well as a pointer to the actual Image Data 103.

Figure 2:
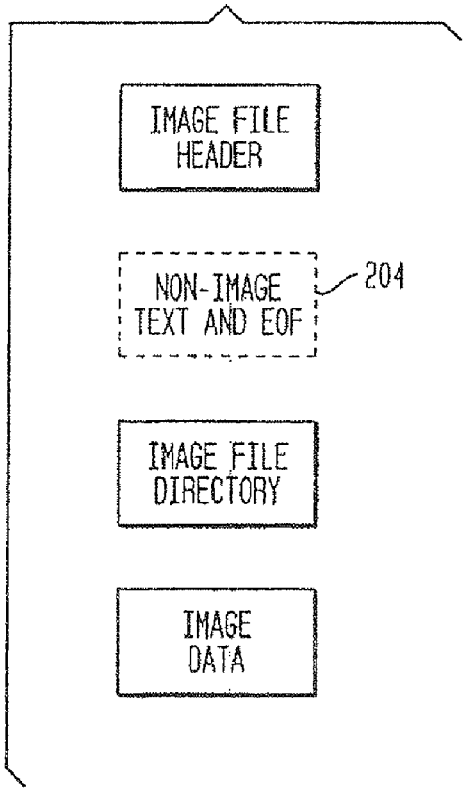
FIG. 2 is a schematic block diagram of composite image and text file.

FIG. 2 illustrates the layout of a modified TIFF file utilized by the preferred embodiment, which contains certain non-image ASCII text (Text) 204. The method for embedding the Text within the TIFF file is to rewrite the file, writing first the Image File Header, then writing the Text, then writing the Image File Directory and the Image Data. It is important to note that an End of File (EOF) character terminates the Text portion. This allows the preferred embodiment to use a standard text file loading procedure when loading the Text into memory. Thus, available text reader software typically ignores data after the EOF character.

Figure 3:
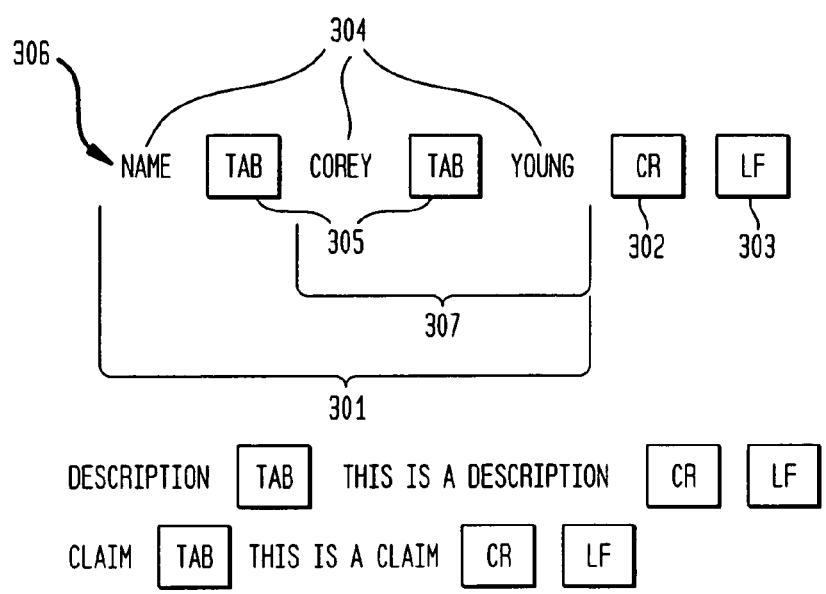
FIG. 3 is a diagram showing structured, fielded format of records and fields.

The format of the Text may be a standard or proprietary format, preferably proprietary in the preferred embodiment. The preferred format consists of a structured, fielded format of records and fields as illustrated in FIG. 3. A record of the text file is considered to be a series of ASCII characters 301 followed by a CR (ASCII 13) character 302, then a LF (ASCII 10) character 303. A record contains one or more fields. Fields 304 are a series of ASCII characters delimited by a tab (ASCII 9) character 305. The first field 306 of a record is the record type. This is typically a word that best describes the piece of data contained in the record. For example, FIG. 3 shows a record of type Description and of type Claim.

The remainder of the fields are typically referred to as the record text 307. There may be multiple fields contained in the record text. However, it is only important to note that there is a distinct first field that is the record type, and each additional field of the record thereafter is a part of the record text 307.

As noted above, the Text portion. e.g., the end of the record text 307, terminates with an EOF character, before the image data begins.

Windows Common Controls

The preferred embodiment utilizes a plurality of Windows® Visual Basic® (VBX) controls. A VBX control is a third party product that provides specific functionality to the utilizing application. The benefit of using VBX controls is that it simplifies the implementation of the preferred embodiment because the needed functionality is already developed by a third party company and encapsulated into the VBX controls.

VBX controls provide functionality using a common programming interface. Specifically, VBX controls provide Methods, Events, and Properties.

Methods are subroutines or functions utilized by the programmer that operate on the VBX controls.

Events are actions, such as clicking the mouse or pressing a key, and for which the programmer can write code to respond. Events can occur as a result of user action or program code, or they can be triggered by the graphic user interface (GUI) system.

Properties are named attributes of VBX controls. Properties define the VBX control's characteristics (such as size, color, screen location, etc.) or VBX control behaviors (whether it is enabled or visible, etc.). Most VBX controls provide a set of similar Properties for manipulating features common to each of the controls. Properties of the VBX controls that are used heavily by the preferred embodiment in the visual display of the summary document information are Top, Left, Height, Width, and Visible. These Properties define the top and left positioning of the control relative to the top of the program's window, the width and height of the control, and whether or not the control is visible to the user.

Some VBX controls are "encapsulating" controls. That is, they allow the program designer to place other VBX controls on top of them. In this case, the VBX controls placed on top of an encapsulating control then become a child of that control.

The VBX controls used in the implementation of the preferred embodiment will now be described in more detail.

For implementing the loading and display of the document image, which as discussed above is stored in the Group-4 compressed TIFF format, the Accusoft ImageGEAR (Gear) product is used. Gear is a VBX control that provides image display and manipulation functionality. Table 1 lists the Properties of Gear that were changed from their defaults at design time, in the implementation of the preferred embodiment. (The other initial properties remain unchanged).

TABLE 1

Initial Properties of Gear

| | |
|---|---|
| BorderStyle = | 0 - None |
| DisplayStretch = | True |
| Name = | ImgDocument |
| Visible = | False |

For implementing the display of the document text embedded in the TIFF file, the BennetTec AllText (AllText) product is used. AllText is a VBX control that provides functionality for the display of text in a formatted manner-similar to that of the Microsoft Rich Text specification. Table 2 lists the Properties of AllText that were changed from their defaults at design time, in the implementation of the preferred embodiment.

TABLE 2

Initial Properties of AllText

| | |
|---|---|
| BorderStyle = | 0 - None |
| DropFileMode = | 1 - Drop Event |
| F3ON = | False |
| MouseHPointer = | 13 - Finger |
| Name = | AtxDocument |
| ScrollBarH = | 1 - Invisible |

For implementing the lab strip located below the display area, the FarPoint Tab Pro (TabPro) product is used. TabPro is a Windows® VBX control that provides functionality for a tab strip similar to the tabs as can be seen on a Property page dialog in Windows®. Table 3 lists the Properties of TabPro that were changed from their defaults at design time, in the implementation of the preferred embodiment.

TABLE 3

Initial Properties of TabPro

| | |
|---|---|
| ActiveTabBold = | False |
| AllignTextH = | 1 - Center |
| AllignTextV = | 1 - Center |
| AllowScroll = | 1 - Scroll (Show Whole) |
| DrawFocusRect = | 1 - No |
| FontBold = | False |
| MarginLeft = | 150 |
| MarginRight = | 150 |
| Name = | TbsDocument |
| Orientation = | 2 - Bottom |
| TabCaption = | Abstract, Bibliographic, References, Cited By, Summary, Drawings, Description, Exemplary, Claims, Notes |
| TabHeight = | 220 |
| TabSeparator = | −12 |
| TabShape = | 1 - Slanted |
| TabStop = | False |
| ThreeDInnerWidth = | 0 |
| ThreeDInnerWidthActive = | 0 |
| Visible = | False |

The TabCaption Property is unique in that its value depends on which tab on TabPro is selected at design time. Thus, the TabCaption Property may have several values at once. Because of this, in Table 3 all of the values used for the sample application utilizing the preferred embodiment are listed for the TabCaption Property. Also note that the TabCaption property for a particular tab can be set at runtime as well. The Tab Property provides an interface to specify which tab's Properties are to be changed. Thus, if a programmer at runtime wanted the TabCaption property changed for the third Tab, they would first set the Tab Property to three, then set the TabCaption property to the new value. Thus, the functionality of the system may be altered through a set-up routine run after distribution of the software.

Another VBX control may be used for implementing the encapsulating 3D frame (Panel) around the display area. Panel provides no real functionality to the preferred embodiment other than to serve both as a frame that encapsulates the other VBX controls used for the display of the summary document information, and as a cosmetic enhancement. Table 4 lists the properties of the Panel control that were changed from their defaults at design time, in the implementation of the preferred embodiment.

TABLE 4

Initial Properties of Panel

| | |
|---|---|
| BevelOuter = | 1 - Inset |
| Caption = | <Null> |
| FontBold = | False |
| FontSize = | 24 |
| Name = | PnDocument |
| Visible = | False |

For implementing the sliding carrots located above and to the left of the display area, the Microsoft Picture Box (PictureBox) VBX control included with Visual Basic™ Professional 3.0 is used. A pre-created bitmap is loaded into this control at design time giving the control the appearance of being a small carrot. Table 5 lists the properties of PictureBox that were changed from their defaults at design time, in the implementation of the preferred embodiment.

TABLE 5

Initial Properties of PictureBox

| | |
|---|---|
| AutoSize = | True |
| BackColor = | &H00C0C0C0& |
| BorderStyle = | 0 - None |
| Name = | SplitterVertical, SplitterHorizontal |
| Visible = | False |

Because there are two PictureBox controls utilized in the preferred embodiment (one for each carrot), two values for the Name property have been listed in Table 5 . Each value corresponds to the instance of the PictureBox control to which it relates.

Host Application

Figure 4:
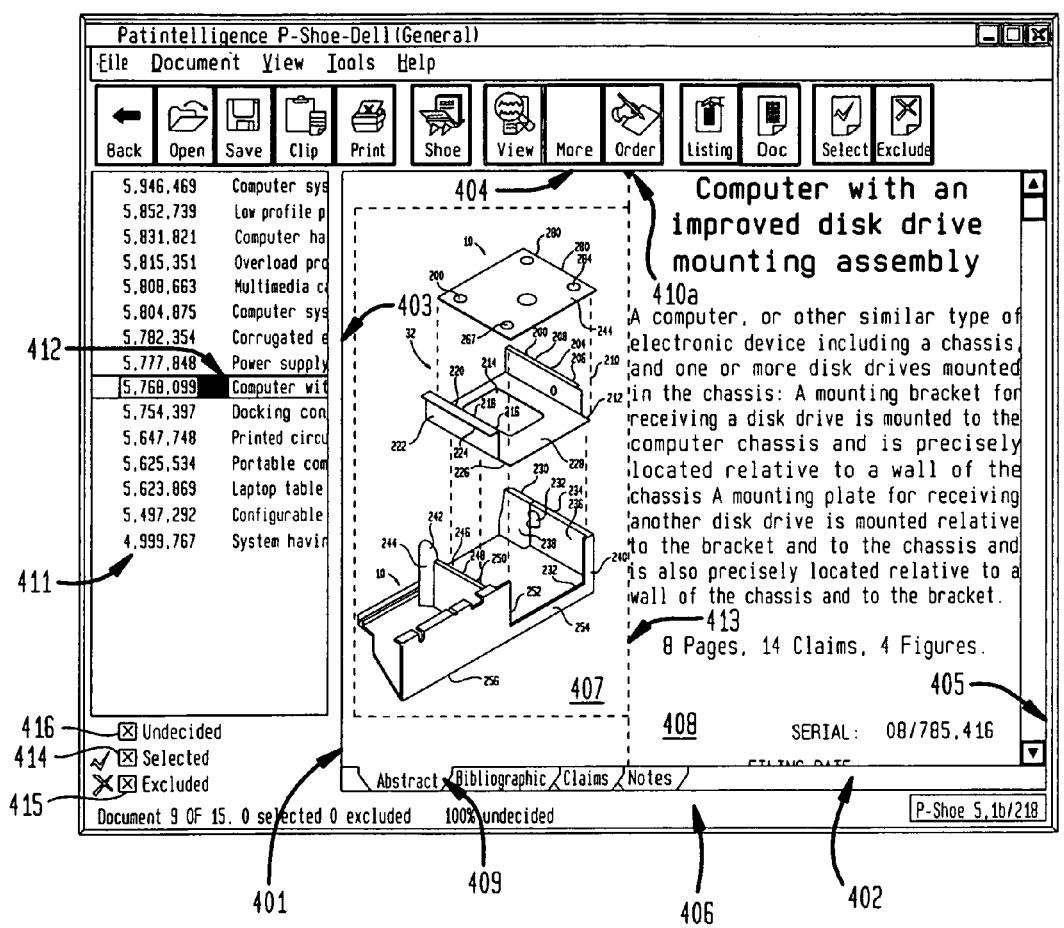
FIG. 4 is a view showing a graphic user interface screen layout with a left-side graphic according to a preferred embodiment.

The preferred embodiment is not of itself an application program. The preferred embodiment represents software-defined functionality that can be utilized by an application program. Thus, hereafter the application program utilizing the preferred embodiment will be referred to as the host application (Host). FIG. 4 provides a display screen of the host application.

The Host must provide a portion of its display window to the preferred embodiment. This is a rectangular area 401 that the preferred embodiment utilizes for the display of the summary document information. This provided area may or may not be sizeable. In the particular Host presented, the area provided to the preferred embodiment is sized in dependence on how the user sizes the Host window.

The area provided is made up of the previously defined VBX controls. Specifically, the Panel control 402 is used to cover the entire area provided. More specifically, the Panel control's Left and Top properties are defined as always being set to the left 403 and top 404 positions of the area provided. The Width and Height properties are defined as always being set to the width 405 and height 406 of the area provided. The encapsulated area provided by the Panel control 401 will hereafter be referred to as the total display area (TDA) utilized by the preferred embodiment for the display of the summary document information.

Encapsulated in the TDA are one instance of the Gear 407, AllText 408, and TabPro 409 VBX controls, and two instances 410a (FIG. 4) and 410b (FIG. 6) of the PictureBox VBX control (one for each carrot). It is important to note that when referring to the Top, Left, Height, and Width properties of these controls, or when referring to values associated with calculating the positioning of these controls within the encapsulated Panel, the Properties and values are relative to the Panel and not the application window.

Hereafter the term Gear will be used when referring to the document image display area or anything related to it.

Hereafter the term AllText will be used when referring to the document text display area or anything related to it.

Hereafter a carrot will be referred to as a PictureBox. When describing the functionality of a carrot, it will be in terms of the horizontal carrots 410a and 410b showh in FIGS. 4 and 6. However, the functionality disclosed serves as the functionality used for implementing both carrots, although the orientation (vertical or horizontal) of each carrot is different and thus certain properties and values may be different in actual practice as anyone skilled in the art will recognize.

The method for choosing a document to be loaded into the preferred embodiment is arbitrary. The Host provides a list of documents 411 from which the user can select. When a document is selected 412, such as by clicking or double-clicking (i.e., generating an appropriate event in association with the document) with the GUI pointing device, the preferred embodiment loads it.

Displaying Document Summary Information

Figure 5:
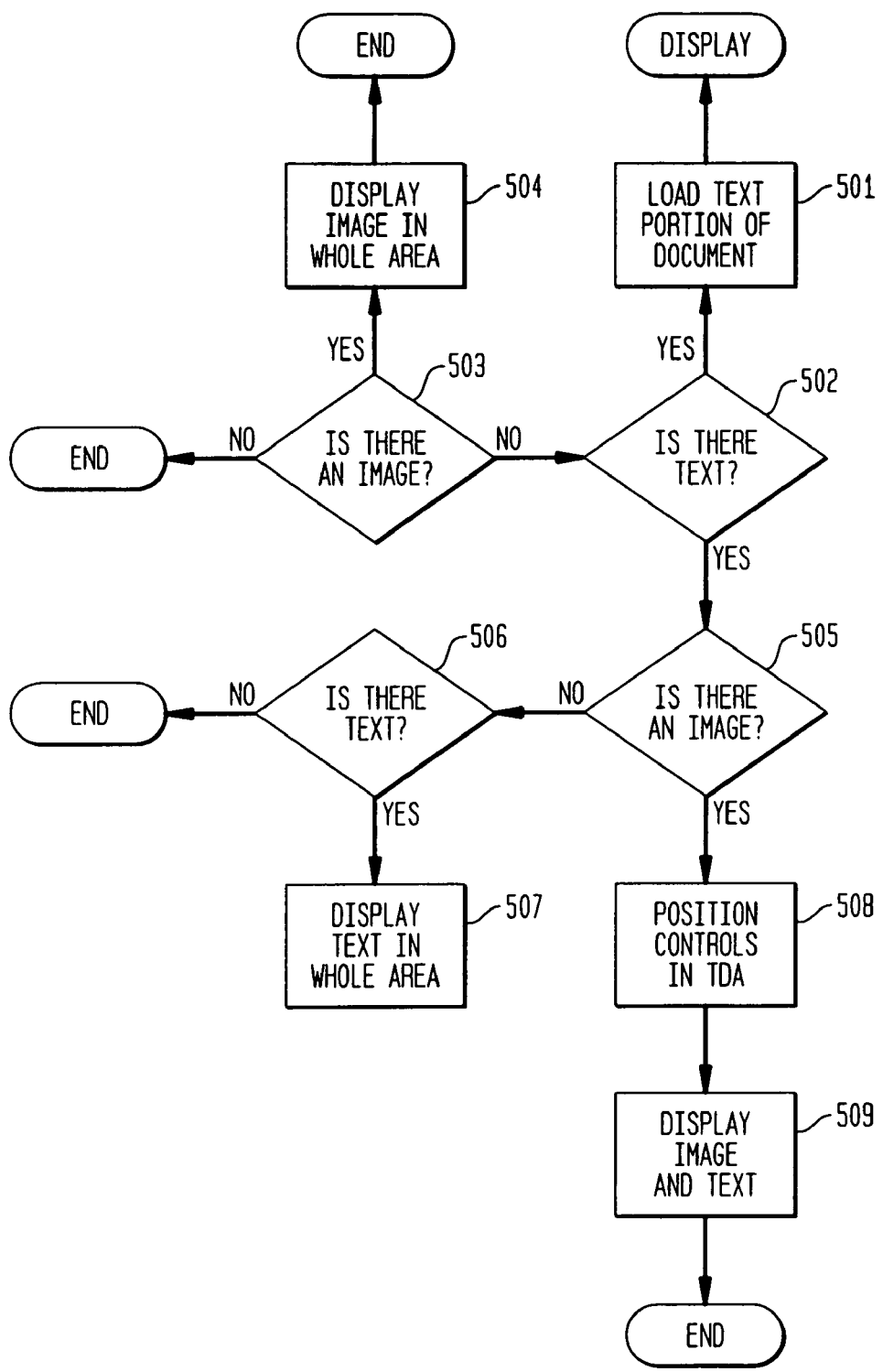
FIG. 5 is a logical flow chart showing a screen format decision process.

The general process for displaying the summary document information is outlined in the flowchart in FIG. 5.

Step 501 loads the text portion of the document specified by the Host into memory. The process of extracting the text from the TIFF file is a straightforward one and recognizable by one skilled in the art. However, it is important to note that the Image File Header 101 must be skipped, i.e., is not intended to be displayed as text. The easiest way to do this is to move the file pointer to byte position 11 in the file, because the Image File Header is always 10 bytes long. Once the file pointer has been positioned at byte 11, the file can be loaded and stored into memory using a known common text file loading procedure, noting the existence of an EOF character at the end of the Text and just before the image data. In the same manner, multiple text files may be addressed by noting their offset from the first byte of the file and initializing the file pointer appropriately. In this case, an EOF is provided after each text segment. All text segments preferably precede the compressed image data. Where the file organization is complex, the first record starting at byte 11 may be an index, with pointers (and possibly descriptive information) stored defining the respective offsets. Managing this index and multiple text records, of course, requires additional logic, which is not further described herein, but implementable without the exercise of undue experimentation by one of ordinary skill in the art. This record management scheme may be implemented as a VBX control or within the Host.

It is also noted that, in the event of sequential records (as opposed to randomly accessible records), the existence and/or nature of a subsequent record may be defined within each Text portion, thus eliminating the need for the above-described index.

The Text is loaded first because it contains additional information helpful to the preferred embodiment in determining if an image is available. More specifically, there exists a record of type Cropped that defines whether or not an image is available. If the Cropped record text contains "Yes" then there exists an image. If it contains "No" then there does not exist an image. Note that the Cropped record is ignored when determining if text information is available. Therefore, the present preferred embodiment provides a common TIFF format file that potentially contains no image information. While TIFF is generally intended for image data, the format provides sufficient flexibility for use as a text file format.

Step 502 checks to see if there exists text information for the document. If no text information in addition to the Cropped record was loaded from the document in Step 501, then the preferred embodiment moves to Step 503. Otherwise, the preferred embodiment moves to Step 505.

Steps 503 checks to see if there exists an image for the document by checking the Cropped record text contents as previously described. If an image does exist, the preferred embodiment moves to Step 504. Otherwise, the preferred embodiment does not display any document information, as none is available.

Records which do not contain any document information, while seemingly useless in the preferred embodiment, may still have utility, since they may contain other data types, including executable code, accounting information, e-mail, etc., which may be handled by the host outside of the preferred embodiment of the human user computer interface.

Advantageously, the system employs a single file type, TIFF, for communication with the Host. Of course, the Host need not be limited to reading or manipulating this file format.

Step 504 displays only an image. To do this, the preferred embodiment sets AllText's Visible Property to False and sets Gear's Width and Height Properties to the width and height of the TDA, respectively. This has the effect of utilizing the entire TDA for the display of the image. The image is loaded into the Gear control using the LoadImage Property of the control.

Step 505 checks to see if there exists an image for the document by checking the cropped record text contents as previously described. If an image does exist, the preferred embodiment moves to Step 508. Otherwise, the preferred embodiment moves to Step 506.

Step 506 checks to see if there exists text information for the document. If no text information in addition to the Cropped record was loaded for the document in Step 501, then the preferred embodiment does not display any document information, as none is available. Otherwise, the preferred embodiment moves to Step 507.

Step 507 displays only the text. To do this, the preferred embodiment sets Gear's Visible Property to False and sets AllText's Width and Height Properties to the width and height of the TDA, respectively. This has the effect of utilizing the entire TDA for the display of the text. The text is loaded into AllText by the Host.

Figure 13:
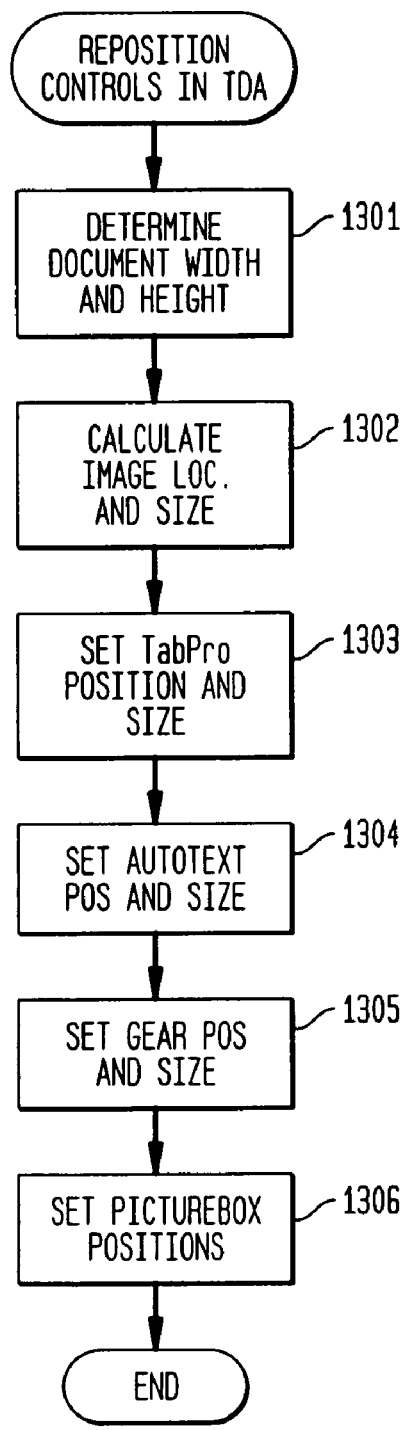
FIG. 13 shows a logical flow chart of the general process for positioning and sizing the controls.

Step 508 calculates and positions the VBX controls on the TDA. The process for doing this is shown in the flowchart of FIG. 13 and will be explained in detail later herein.

Step 509 loads the image into Gear and the text into AllText using the same methods as described in Steps 504 and 507, with the one exception that Gear and AllText do not fill the entire area as described, but instead remain in their positions as determined by Step 508. The Visible Property of Gear and AllText is set to True.

User Specified Settings

The user-specified settings are maintained using internal variables specific to the preferred embodiment. An internal variable is a term recognized by those skilled in the art. Table 6 shows the internal variable names used and their corresponding purposes. Note that these variable names will be used throughout the remainder of the description of the preferred embodiment for equations and illustrative purposes.

TABLE 6

Internal Variables for User-Specified Settings

| | |
|---|---|
| ImagePosition | The position of the document image in relation to the text. This is a mutually exclusive setting with the value being one of the three possible constant values: |
| ImagePositionAuto | Specifies that the image position in relation to the text should be auto-calculated based on the image width and height and the TDA width and height. |
| ImagePositionAbove | Specifies that the image should be positioned above the text. |
| ImagePositionLeft | Specifies that the image should be positioned to the left of the text. |
| SplitterPosVertical | The maximum TDA space the drawing is allowed to occupy when positioned above the text. This is a value that is a percentage of the TDA height and is clamped to the range [10, 50] (e.g., 20 would be 20%) where the range is an integer value. |

TABLE 6-continued

Internal Variables for User-Specified Settings

| | |
|---|---|
| SplitterPosHorizontal | The maximum TDA space the drawing is allowed to occupy when positioned to the left of the text. This is a value that is a percentage of the TDA width and is clamped to the range [10, 50] (e.g., 20 would be 20%) where the range is an integer value. |

Figure 6:
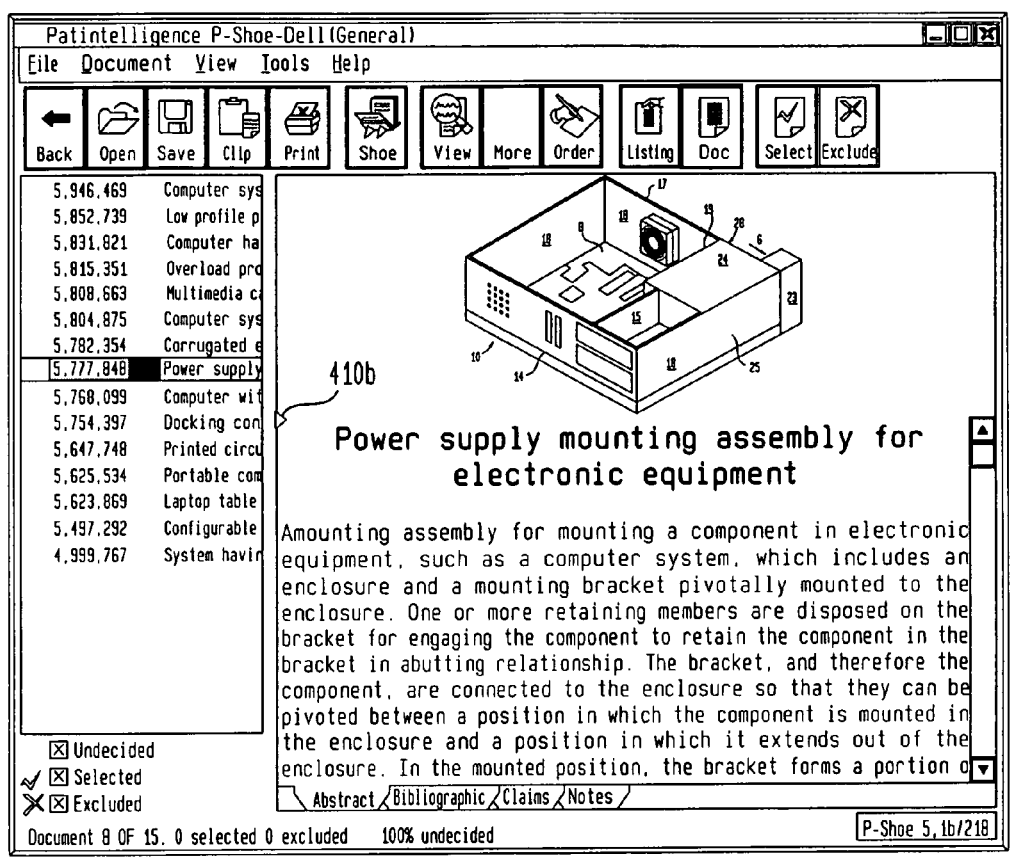
FIG. 6 is a view showing a graphic user interface screen layout with a top side graphic according to a preferred embodiment.

The preferred embodiment allows the user to explicitly specify whether they want the document image oriented above the text as illustrated in FIG. 6, to the left of the text as illustrated in FIG. 4, or whether the document image orientation should be auto-calculated. This user-specified setting will be referred to as the Orientation setting hereafter and is defined by the variable ImagePosition described in Table 6. In addition, when referring to the orientation of the image hereafter, it is to be assumed to be in relation to the text (above the text or to the left of the text).

When the Orientation setting is set to auto-calculate, the preferred embodiment orients the image based on the TDA height 405 and width 406, image height and width, and a setting to be described later that defines the maximum percentage of area 413 of the TDA the image is allowed to use. The auto-calculation setting allows the preferred embodiment to find an optimal orientation for the image (e.g., display the image to the left of the text in the case where the Host window is sized to be very wide). This allows the user to see as much information as possible.

The preferred embodiment allows the user to specify the maximum percentage of area of the TDA the image is allowed to use. Because there are two possible orientations for the image as illustrated in FIGS. 6 and 4, the user is allowed to specify this percentage separately for each orientation as defined by the variables SplitterPosVertical and SplitterPosHorizontal as described in Table 6. These two settings will be referred to as Maximum Percentage settings hereafter.

Figure 7:
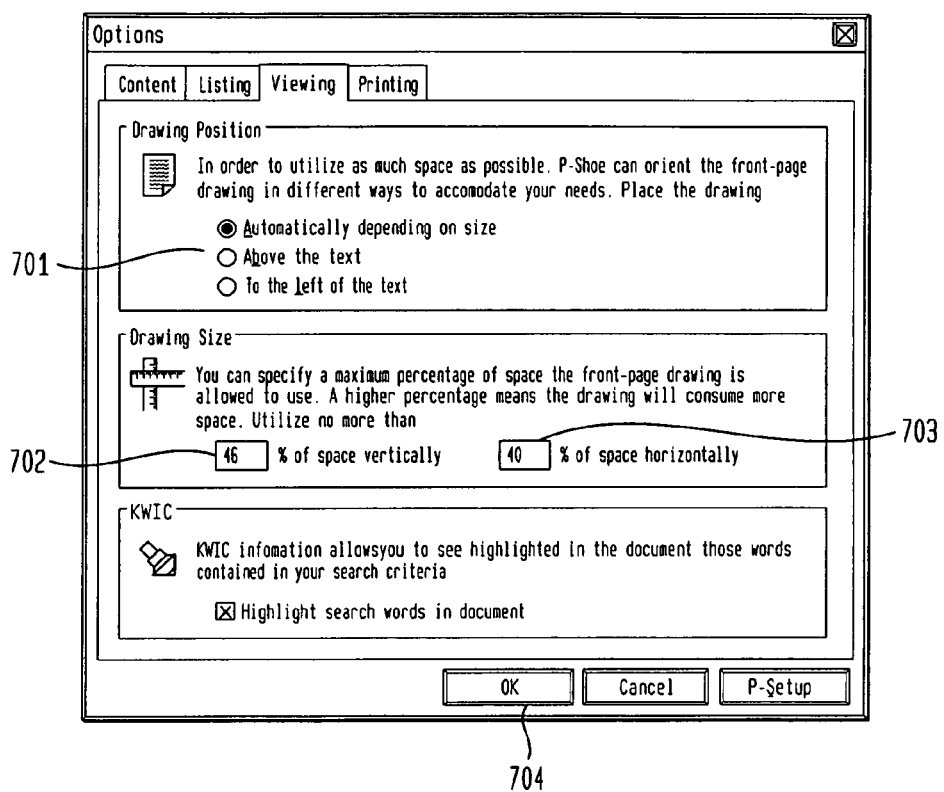
FIG. 7 is a view of a dialog box for receiving user display format preferences.

The Host allows the user to specify these settings using a settings dialog. FIG. 7 shows a display screen of the settings dialog. Here it can be seen that ImageOrientation can be set using 701, SplitterPosVertical by 702, and SplitterPosHorizontal by 703. When the user presses the OK button 704, the setting values specified by the user in the dialog are recorded into the internal variables shown in Table 6. The values of the settings may be stored in non-volatile memory, such in a file on a computer hard disk. This can be done using any generalized saving method understood by anyone educated in the art. These values may be stored, for example, in a so-called ".INI" file.

The preferred embodiment also inherently provides the ability to change the SplitterPosVertical and SplitterPosHorizontal settings using the two carrots located on the top and left edges of the TDA. The carrots are implemented using the PictureBox control. As previously described, in the preferred embodiment a pre-created bitmap is loaded into PictureBox at application design time. This provides the visual appearance of the carrot.

The preferred embodiment allows the user to move PictureBox using the GUI mouse interface mechanism. As previously described; a typical GUI provides feedback to an application in the form of an Event whenever the user performs different actions using the various input devices, such as a mouse. The Events that the preferred embodiment traps for PictureBox manipulation are defined in Table 7.

TABLE 7

Events Trapped by the Preferred Embodiment for Manipulating the PictureBoxes

| | |
|---|---|
| MouseDown | The event sent by the GUI when the mouse button is pressed by the user. |
| MouseMove | The event sent by the GUI when the mouse is moved. |
| MouseUp | The event sent by the GUI when the mouse button is depressed by the user. |

In order to track when PictureBox is being dragged and how far it has been dragged, the preferred embodiment utilizes the variables listed in Table 8.

TABLE 8

Internal Variables Used for Moving PictureBoxes

| | |
|---|---|
| SplitterDragging | A bit flag that is set to True when the user has Initiated dragging of the PictureBox. The bit flag is maintained True until the user stops dragging the PictureBox |
| SplitterMousePos | Specifies the position of the mouse on the screen When dragging is initiated. |
| MousePos | Specifies the position of the mouse on the screen when a mouse-related event is triggered by the GUI. |

When the PictureBox control receives the MouseDown event (the user has pressed the mouse button down while the mouse cursor is over the PictureBox), the SplitterDragging flag is set to True. This means that the user has initiated a drag of the PictureBox control with the mouse. The SplitterMousePos variable is set to MousePos.

When the mouse is moved, the PictureBox control receives the MouseMove event. When this event is received, if SplitterDragging is True, the preferred embodiment knows that the user has moved the mouse while holding the mouse button down over the PictureBox. In order to simulate a dragging movement of the PictureBox, the preferred embodiment calculates how far the PictureBox must be moved in order to correlate with how far the user has moved the mouse. This is done using the pseudo-code in Listing 1. Note that the distance to move is clamped to the same range as the SplitterPosVertical and SplitterPosHorizontal settings.

Listing 1

Listing 1

```
If SplitterDraaging Then
    MoveDistance = PictureBox.Left + MousePos.X − SplitterMousePos.X
    If MoveDistance > (TDAWidth * 0.75) Then
        MoveDistance = TDAWidth * 0.75
    ElseIf MoveDistance < (TDAWidth * 0.10) Then
        MoveDistance = TDAWidth * 0.10
    End If
    SplitterPosHorizontal = (PictureBox.Left / TDAWidth) * 100
    PictureBox.Left = MoveDistance
    ResizeForm ' Causes summary document information to be redisplayed.
End If
```

If the MouseMove event is received while SplitterDragging is True, the positions and sizes of the controls on the TDA are recalculated by forcing a call to resize the Host window. Because the process of calculating the positions and sizes of the controls on the TDA are relatively non-complex, the user does not perceives jittering or other artifacts typically associated with complex operations. In addition, the user sees a visual difference in the amount of space taken up by the image and text. The process of positioning and sizing the controls on the TDA will be explained in further detail later on in the description of the preferred embodiment.

When the PictureBox control receives the MouseUp event (the user has depressed the mouse button while the mouse cursor is over the PictureBox), the SplitterDragging flag is set to False.

The process just described of trapping the MouseDown, MouseMove, and MouseUp events to simulate dragging of the PictureBox is a process understood by anyone educated in the art. Hereafter we will refer to this as a dragging process.

Whenever the PictureBox control is dragged, the SplitterPosVertical and SplitterPosHorizontal settings are adjusted accordingly. For example, if the horizontal PictureBox is dragged to within 20% of the left edge of the TDA, then a value of 20 is placed in the SplitterPosHorizontal setting.

Figure 8:
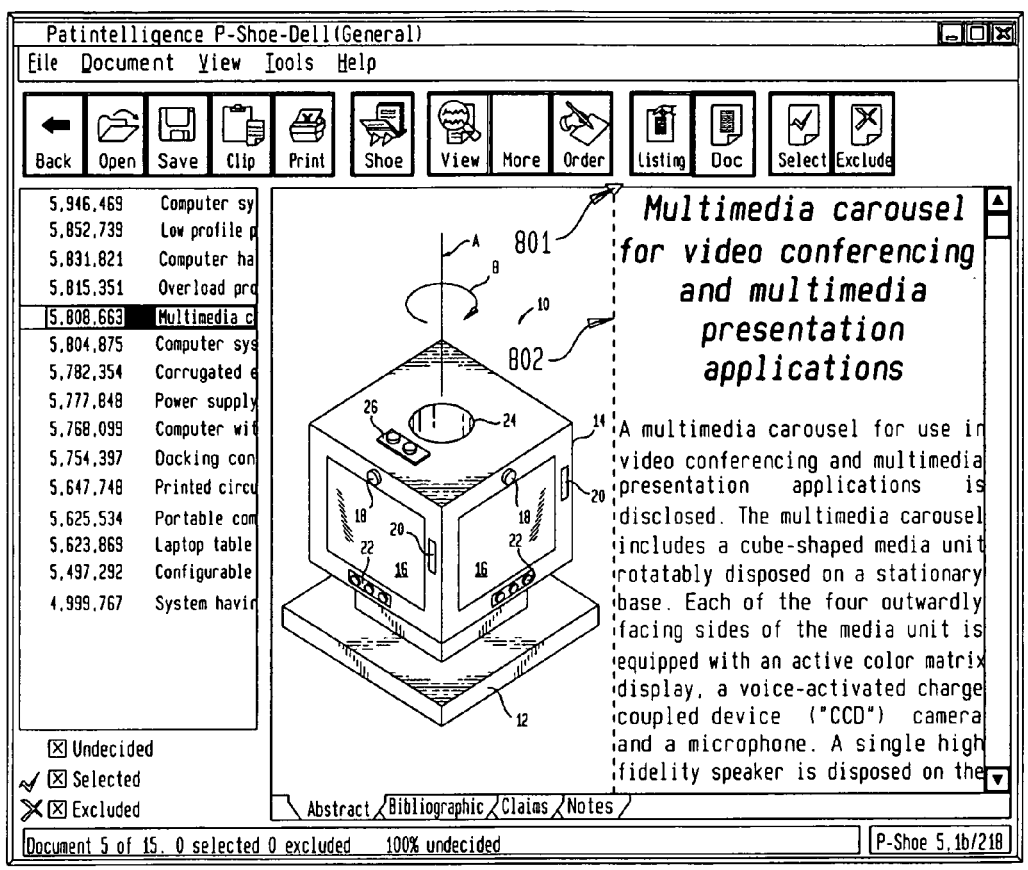
FIGS. 8 and 9 are two display screens of a preferred embodiment respectively before and after a PictureBox has been moved.
Figure 9:
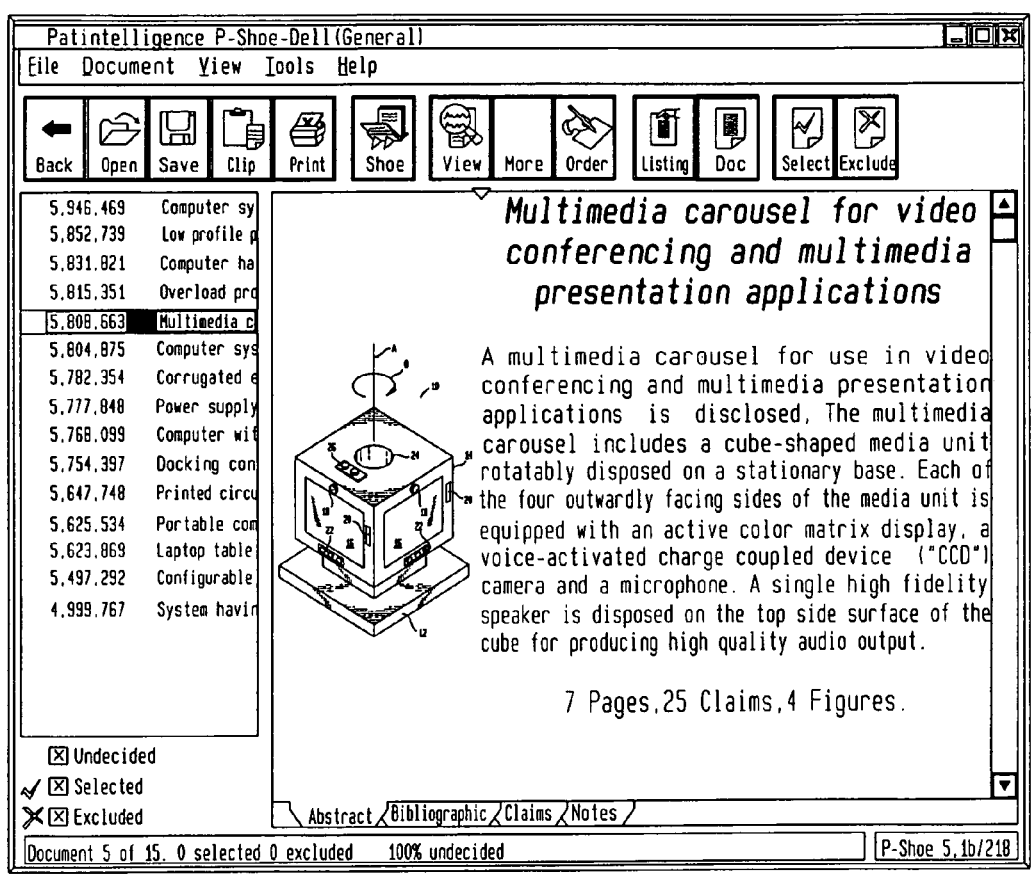

FIGS. 8 and 9 are two display screens of the preferred embodiment before and after the PictureBox 801 has been moved. It can be seen that the maximum percentage area 802 that the image is permitted to occupy has changed, and thus the image is now smaller than it was before.

Figure 10:
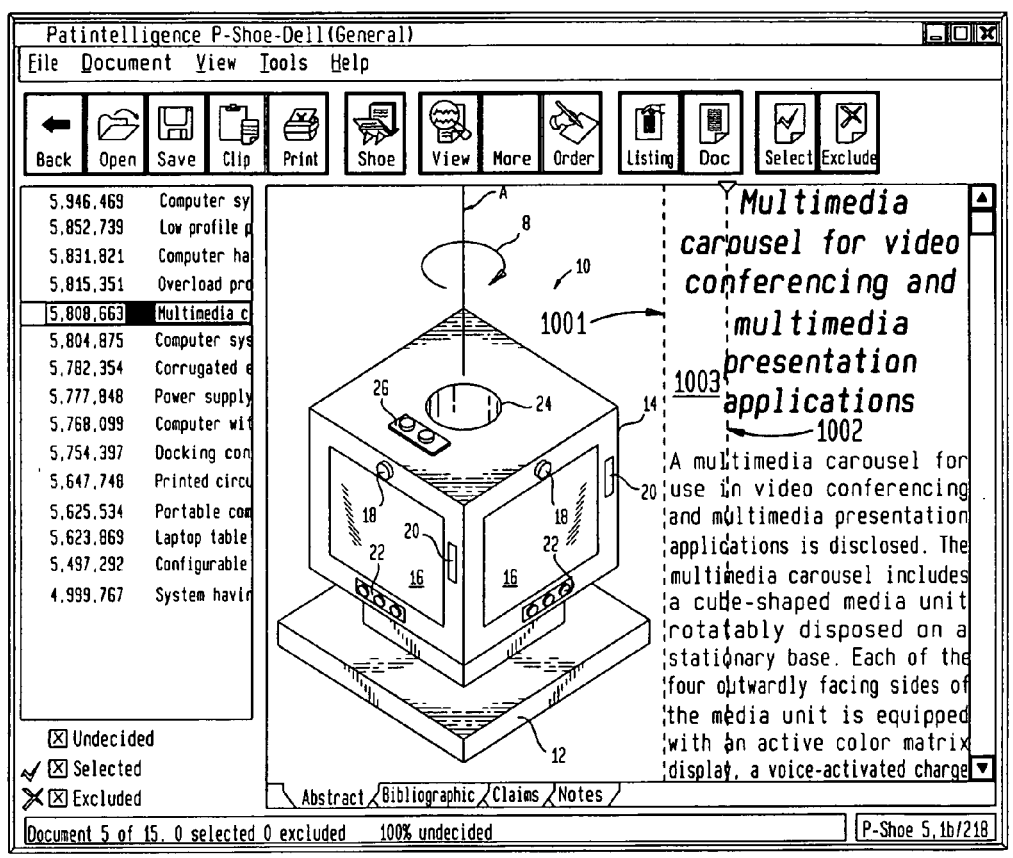
FIG. 10 shows a display screen of a preferred embodiment where the width of an image doesn't fill the horizontal space provided by the maximum percentage area setting.

FIG. 10 shows a display screen of the preferred embodiment where the image width 1001 doesn't fill the horizontal space provided by the maximum percentage area 1002 setting. It can be seen that the text area expands to fill the area 1003 unused by the image. This illustrates that the setting is a maximum percentage area that the image is permitted to occupy, not a specific defined percentage area that the image will occupy.

Calculation of Control Positions and Sizes

There are three cases in which the position and size of the controls on the TDA should be recalculated.

First, whenever a new document is loaded the positions and sizes must be recalculated. This is because the image width and height parameters may be different from document to document. FIGS. 4 and 6 show display screens of the preferred embodiment displaying two different documents, each document having a unique image size. Note that the TDA size is the same for each display screen. The orientation of the image in relation to the text is different for each document, thus showing how the preferred embodiment made a different decision because of different image sizes.

Figure 11:
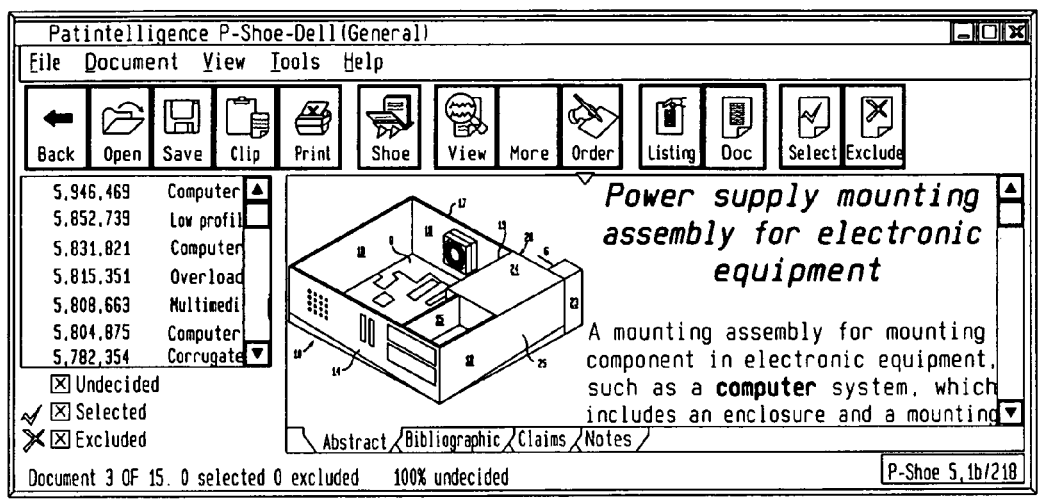
FIGS. 11 and 12 show display screens of a preferred embodiment with two different total display area sizes, wide and tall, respectively.
Figure 12:
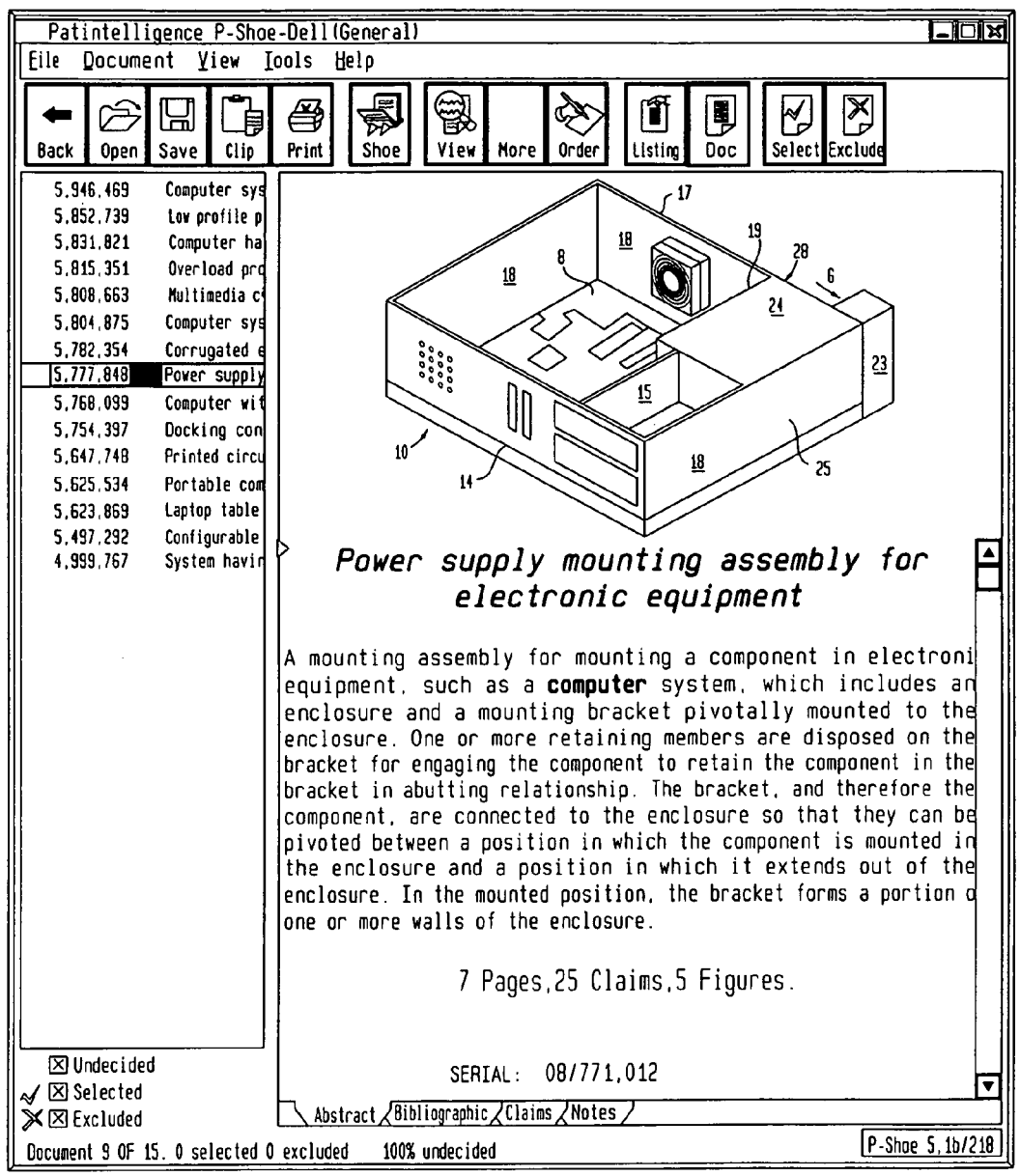

Second, when the TDA size has changed the positions and sizes must be recalculated because the preferred embodiment may find a more optimal orientation and size for the image in relation to the text. FIGS. 11 and 12 show display screens of the preferred embodiment with two different TDA sizes, FIG. 11 showing the preferred embodiment with a TDA that is wide and small, and FIG. 12 showing a TDA that is tall. These figures illustrate how the preferred embodiment may make a different decision on image orientation based on TDA size parameters.

Third, when the user-specified settings have been changed, the positions and sizes must be recalculated because the user-specified settings directly effect the amount of space the image is allowed to cover, as well as the orientation of the image in relation to the text. TDA settings will be described in more detail later in this description.

The general process for positioning and sizing the controls is shown in the flowchart in FIG. 13.

Step 1301 determines the width and height of the TDA. This should not be confused with Panel's Width and Height Properties. The Panel control has a slight 3D edge that needs to be compensated for in the calculation of the TDA, which can be performed using simple formulas.

Figure 14:
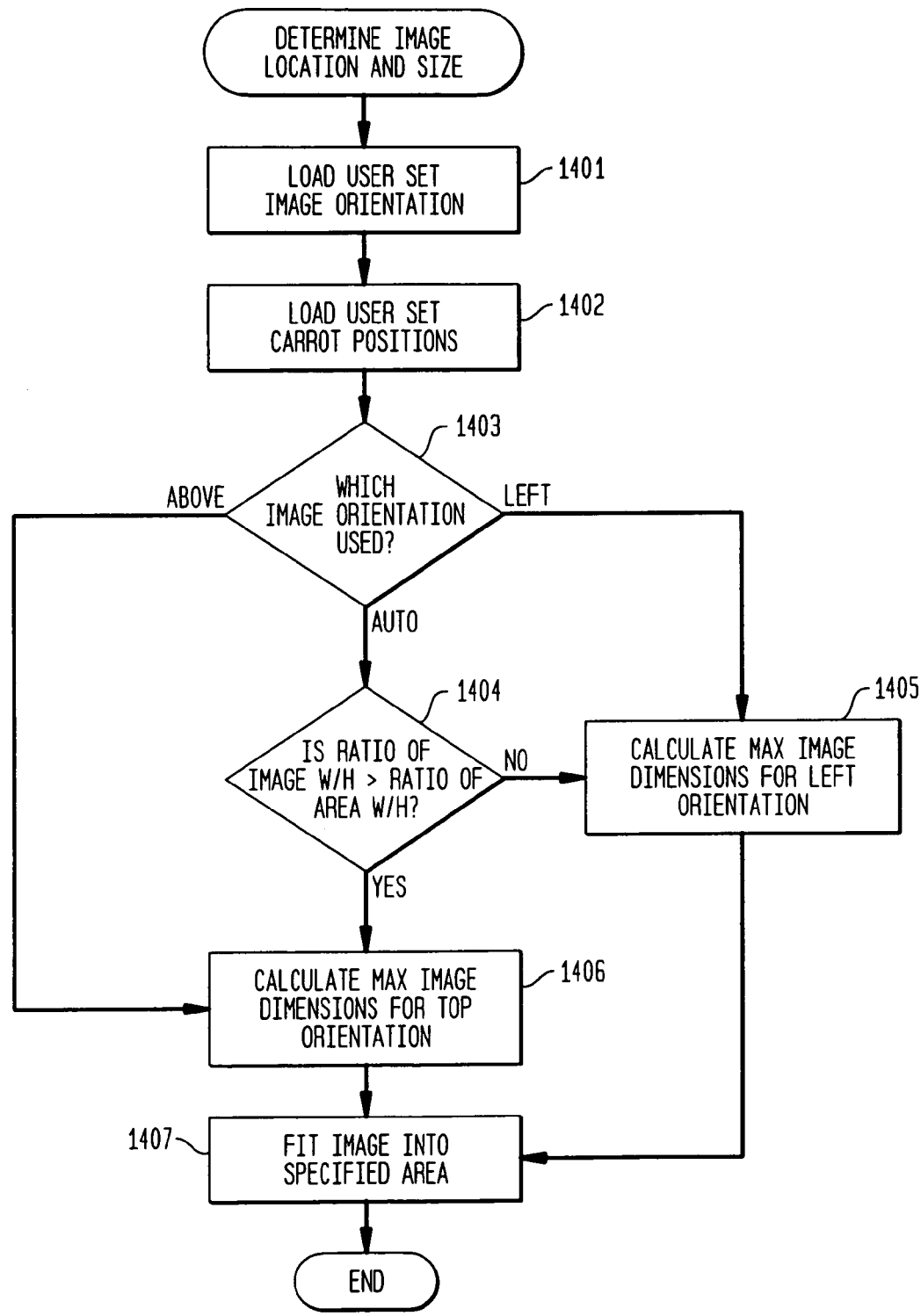
FIG. 14 shows a logical flow chart that calculates the image size and orientation with relation to a text portion.

Step 1302 calculates Gear's size and orientation with relation to AllText. This process is illustrated in the flowchart contained in FIG. 14 and will be described in more detail later on in this description.

The specific purpose of step 1302 is to calculate the variables ImageHeight, ImageWidth, and ImageOrientation. The use of these variables is described in Table 9.

TABLE 9

InternalVariables Used for Calculating Control Positions

| | |
|---|---|
| ImageOrientation | The position of the image in relation to the text. This is a mutually exclusive setting with the value being one of the three previously described constant values DrawingPositionAuto, DrawingPositionAbove, and DrawingPositionLeft. |
| ImageHeight | The final height for Gear. |
| ImageWidth | The final width for Gear. |
| MaxWidth | The maximum width the image is allowed to occupy in the TDA. This does not mean that the final image width will be MaxWidth, but only that the final image width cannot be more than MaxWidth. |
| MaxHeight | The maximum height the image is allowed to occupy in the TDA. This does not mean that the final image height will be MaxHeight, but only that the final image height cannot be more than MaxHeight. |

Step 1303 sets the position and size of TabPro. The TabPro position and size are set according to Table 10. This serves the purpose of sizing TabPro such that it encapsulates the entire TDA. It is important to note that TabPro is encapsulated by Panel (it is a child of Panel). However, even though TabPro is expanded to fill the entire TDA, it does not encapsulate any other controls (e.g., Gear, AllText, etc.).

TABLE 10

Position and Size of TabPro

| | | |
|---|---|---|
| TabPro.Left | = | 30 |
| TabPro.Top | = | 30 |
| TabPro.Width | = | TDAWidth − 50 |
| TabPro.Height | = | TDAHeight − 50 |

Step 1304 sets the position and size of AllText. The position and size of AllText is dependent on the value of the ImageOrientation variable. If it is determined that the image should be oriented above the text, the AllText position and size are set according to Table 11. If it is determined that the image should be oriented to the left of the text, the AllText position and size are set according to Table 12.

TABLE 11

Position and Size of AllText for Top Orientation

| | | |
|---|---|---|
| AllText.Left | = | DocumentEdgeWidth |
| AllText.Top | = | ImageHeight + DocumentEdgeWidth |
| AllText.Width | = | DocumentWidth + 40 |
| AllText.Height | = | DocumentHeight − ImageHeight + (DocumentEdgeWidth * 2) |

TABLE 12

Position and Size of AllText for Left Orientation

| | | |
|---|---|---|
| AllText.Left | = | ImageWidth + DocumentEdgewidth |
| AllText.Top | = | DocumentEdgeWidth |
| AllText.Width | = | DocumentWidth − ImageWidth + DocumentEdgeWidth + 60 |
| AllText.Height | = | DocumentHeight |

Step 1305 sets the position and size of Gear. As with AllText, the position and size of Gear are dependent on the value of the ImageOrientation variable. If it is determined that the image should be oriented above the text, the Gear position and size are set according to Table 13. If it is determined that the image should be oriented to the left of the text, the AllText position and size are set according to Table 14. It can be appreciated that Gear is always centered horizontally or vertically, depending on its orientation with respect to AllText.

TABLE 13

Position and Size of Gear for Top Orientation

| | | |
|---|---|---|
| Gear.Left | = | (DocumentWidth/2) − (Gear.Width/2) |
| Gear.Top | = | DocumentEdgeWidth |
| Gear.Width | = | ImageWidth |
| Gear.Height | = | ImageHeight |

TABLE 14

Position and Size of Gear for Left Orientation

| | | |
|---|---|---|
| Gear.Left = | | DocumentEdgeWidth |
| Gear.Top = | | (DocumentHeight/2) − (Gear.Height/2) |
| Gear.Width = | | ImageWidth |
| Gear.Height = | | ImageHeight |

Step 1306 sets the position of the two instances of PictureBox. The visibility of each PictureBox is determined by the ImageOrientation variable. To help avoid confusion to the user, the preferred embodiment only allows the user to adjust one PictureBox at a time. If the image is oriented to the top of the text, then the vertical PictureBox is made visible and the horizontal made non-visible. If the image is orientated to the left of the text, then the horizontal PictureBox is made visible and the vertical made non-visible. The positions of each PictureBox are set according to Table 15. Note that only the Left Property is set for the vertical PictureBox, and only the Top Property is set for the horizontal PictureBox.

TABLE 15

Position and Size of PicturesBoxes

| | | |
|---|---|---|
| PictureBox.Left | = | DocumentWidth * DocSplitterPosVert * 0.01 |
| PictureBox.Top | = | DocumentHeight * DocSplitterPosHoriz * 0.01 |

It is noted that the screen display layout for the text and image may differ from the printer output. Preferably, a separate set of print preferences is provided to define a text font, layout, image size, and other properties of a printed record. These preferences may also be persistently stored. According to a preferred embodiment, an intelligent layout feature ensures that most records fit on a single printed page.

Calculation of Image Size

The positioning of the Gear, AllText, and PictureBox controls is dependent upon user selected TDA settings, the area of the TDA, and the document being displayed.

Figure 17:
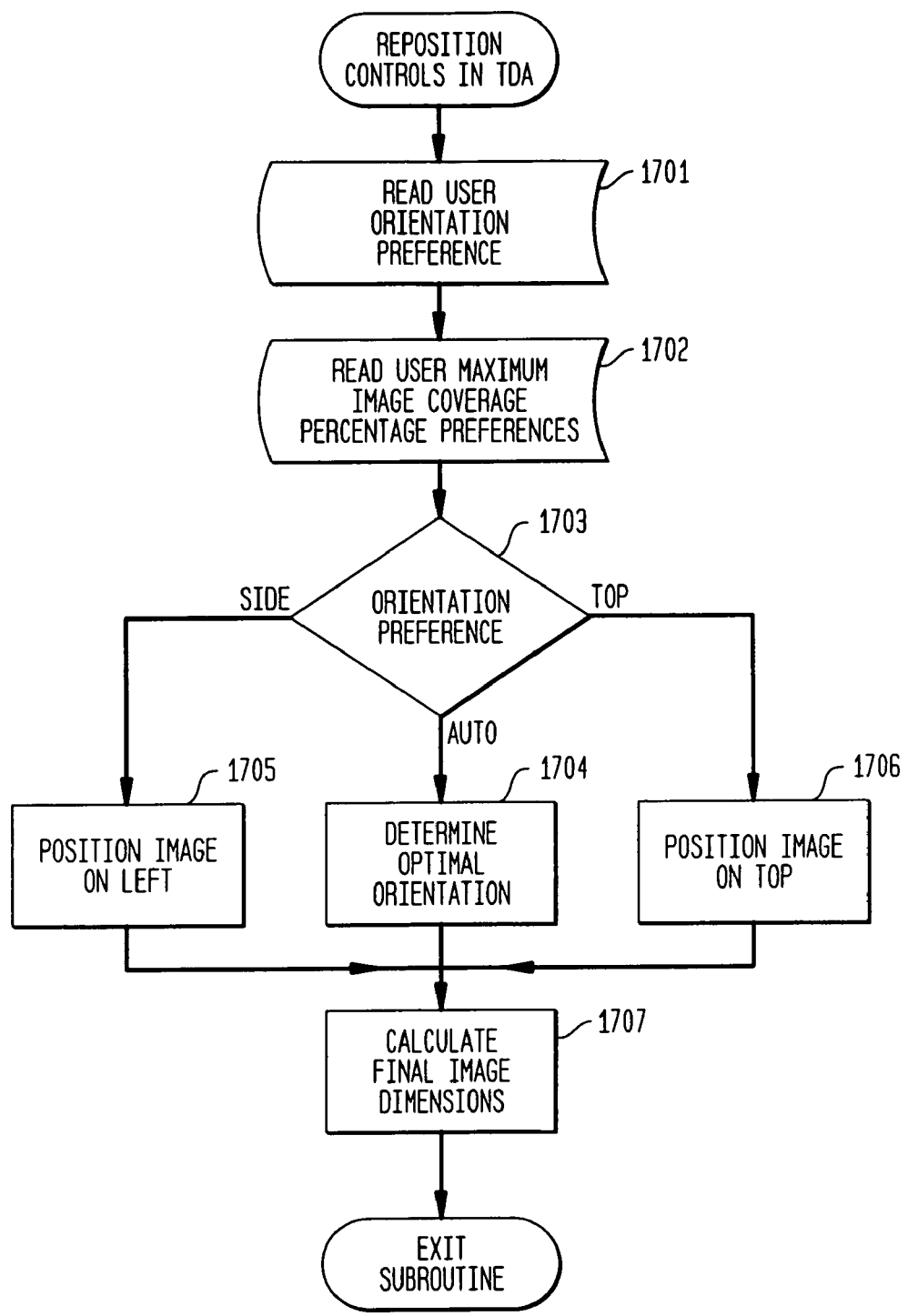
FIG. 17 shows a flow chart illustrating the detailed steps needed to calculate the image and text control coverage areas.

When calculating the position and sizes of the Gear and AllText controls, the preferred embodiment takes into consideration the previously describes settings, specifically, the orientation of the image in relation to the text, and the maximum space the image is allowed to occupy. FIG. 17 shows a flow chart illustrating the detailed steps needed to calculate the Gear and AllText control coverage areas.

The first step in calculating the Gear and AllText coverage areas is to load from memory or hard drive the user's orientation preference (1701) and the user's maximum image coverage percentages (1702). Methods for specifying this information have already been described.

Once this information has been loaded, the preferred embodiment determines where the Gear should be located in relation to the AllText (1703). As previously described, the preferred embodiment allows the user to specify one of three orientations for the image relative to the text: to the left of, above, and automatically. Regardless of which orientation has been specified, the preferred embodiment utilizes several variables that are set to values that correspond with the orientation specified. These variables are shown in Table 9

If the user has specified that the image be explicitly located to the left of the text in all cases (perhaps they have sized the Host window to be wide and short), then the preferred embodiment moves to step (1705). In this step the orientation variables are set to the values shown in Table 10.

If the user has specified that the image be explicitly located above the text in all cases (perhaps they have sized the Host window to be narrow and tall), then the preferred embodiment moves to step (1706). In this step the orientation variables are set to the values shown in Table 11. The maximum width of the image is defined as being a percentage of the width of the TDA as specified by the position of the vertical carrot. The maximum height of the image is defined as being the height of the TDA because it will be located to the left of the text and thus is allowed to fit as much of the vertical area as is available.

However, if the user has specified that the image be orientated relative to the text automatically, then the preferred embodiment moves to step (1704) to calculate an optimal orientation for the image. An optimal orientation is defined as being the preferred orientation (above or to the left of the text) that would allow the user to see the most information. The maximum width of the image is defined as being the width of the TDA because it will be located above the text and thus is allowed to fit as much of the horizontal area as is available. The maximum height is defined as being a percentage of the height of the TDA as specified by the position of the horizontal carrot.

Whether the user has specified that the image be orientated above or to the left of the text, it is important to remember that the MaxWidth and MaxHeight values are not necessarily final values for the image. They are values representing the maximum area that the image is allowed to cover. In practice, the image will cover much less area.

If the user has specified they want auto-orientation, then the preferred embodiment must calculate whether either left or top orientation would be preferable, based on image width and height, and total document summary coverage area width and height (1704). Applying a simple ratio calculation, as understood by those skilled in the art, accomplishes this.

If the ratio of the image's width and height is greater than the ratio of the TDA's width and height, then the preferred embodiment moves onto the step of calculating the maximum image coverage values needed to calculate the final image dimensions based on a top orientation (1706). The orientation variables will be set to the values shown in Table 10.

Otherwise, the preferred embodiment moves onto the step of calculating the maximum image coverage values needed to calculate the final image dimensions based on a left orientation (1705). The orientation variables will be set to the values shown in Table 9.

The pseudo-code for steps (1703), (1704), (1705), and (1706) is shown in Listing 2.

Listing 2

```
Sub SetOrientation (DrawingOrientation, MaxWidth, MaxHeight)
    If ImagePosition = ImagePositionLeft
        SetLeft (DrawingOrientation, MaxWidth, MaxHeight)
    If ImagePosition = ImagePositionAbove
        SetAbove(DrawingOrientation, MaxWidth, MaxHeight)
    If ImagePosition = ImagePositionAuto
        If DrawingWidth > DrawingHeight * (TDAWidth / TDAHeight) Then
            SetAbove(DrawingOrientation, MaxWidth, MaxHeight)
        Else
            SetLeft(DrawingOrientation, MaxWidth, MaxHeight)
        End If
    End If
End Sub
Sub SetLeft (DrawingOrientation, MaxWidth, MaxHeight)
    DrawingOrientation = DrawingPositionLeft
    MaxWidth = TDAWidth * (SplitterPosVertical * 0.01)
    MaxHeight = TDAHeight
End Sub
Sub SetAbove (DrawingOrientation, MaxWidth, MaxHeight)
    DrawingOrientation = DrawingPositionAbove
    MaxWidth = TDAWidth
    MaxHeight = TDAHeight * (SplitterPosHorizontal * 0.01)
End Sub
```

Regardless of which of the three orientations the user has specified, once MaxWidth and MaxHeight have been specified, the preferred embodiment then calculates the final image dimensions (1707). This calculation is based on the need to fit the image into the coverage area available to the image as specified in the MaxWidth and MaxHeight variables. This allows the preferred embodiment to force the image to fit within the specified image coverage area without exceeding either the bounds of the user specified maximum percentage, nor the bounds of the TDA itself.

Listing 3 shows the pseudo-code for calculating the final image area dimensions. Once the final image dimensions have been determined, they are stored in memory for use when it becomes necessary to draw the image and text onto the form or dialog.

Listing 3

```
Width = ImageWidth / MaxWidth
Height = ImageHeight / MaxHeight
If (ImageWidth / Height) <= MaxWidth Then
    Divisor = Width
Else
    Divisor = Height
AreaWidth = Width / Divisor
AreaHeight = Height / Divisor
```

The AreaWidth and AreaHeight values hold the final values that will later be assigned to the Gear's Height and Width Properties, respectively. The process of determining whether or not the preferred embodiment will need to use these values will be discussed in further detail herein-below.

When the Host starts, the Visible property of the Gear. AllText, and PictureBox controls is set to False. This provides the user with a visual appearance that there is no document loaded.

Section Headings and Tabs

The preferred embodiment recognizes the record type and uses it to generate section headings and tabs. As the document text is loaded into the AllText control, each new record type that becomes available is added to the AllText as a heading and to the TabPro. Listing 4 shows the pseudo code used for this operation.

---
Listing 4
---
```
LoadText
PrevRecordType = Null
For Each Record
    If RecordType < > PrevRecordType Then
        AddHeading RecordType
        PrevRecordType = RecordType
        AddText RecordText
    AddHeading RecordType
        TabPro.Tab = SectionIndex
        TabPro.TabTag = SectionIndex
        TabPro.TabState = TabEnable
        SectionRange(SectionIndex) = AllText.CurPar=09
        AllText.SelLength = 1
        AllText.NTag = SectionIndex
        SectionIndex = SectionIndex + 1=09
```
---

In this operation, it is important to note that there will exist one tab on the TabPro for each section that is loaded.

The variable SectionIndex keeps track of which section is currently being loaded. As the sections are loaded into the AllText control, the particular associated Tab of the TabPro is displayed and updated with the needed information about the current section.

The SectionRange variable is set to the current cursor location in the AllText control as it is being loaded, and the NTag Property of the particular tab of the TabPro is set to the current SectionIndex. This allows the preferred embodiment to utilize this information at a later time to synchronize the tabs with the displayed text.

Figure 18:
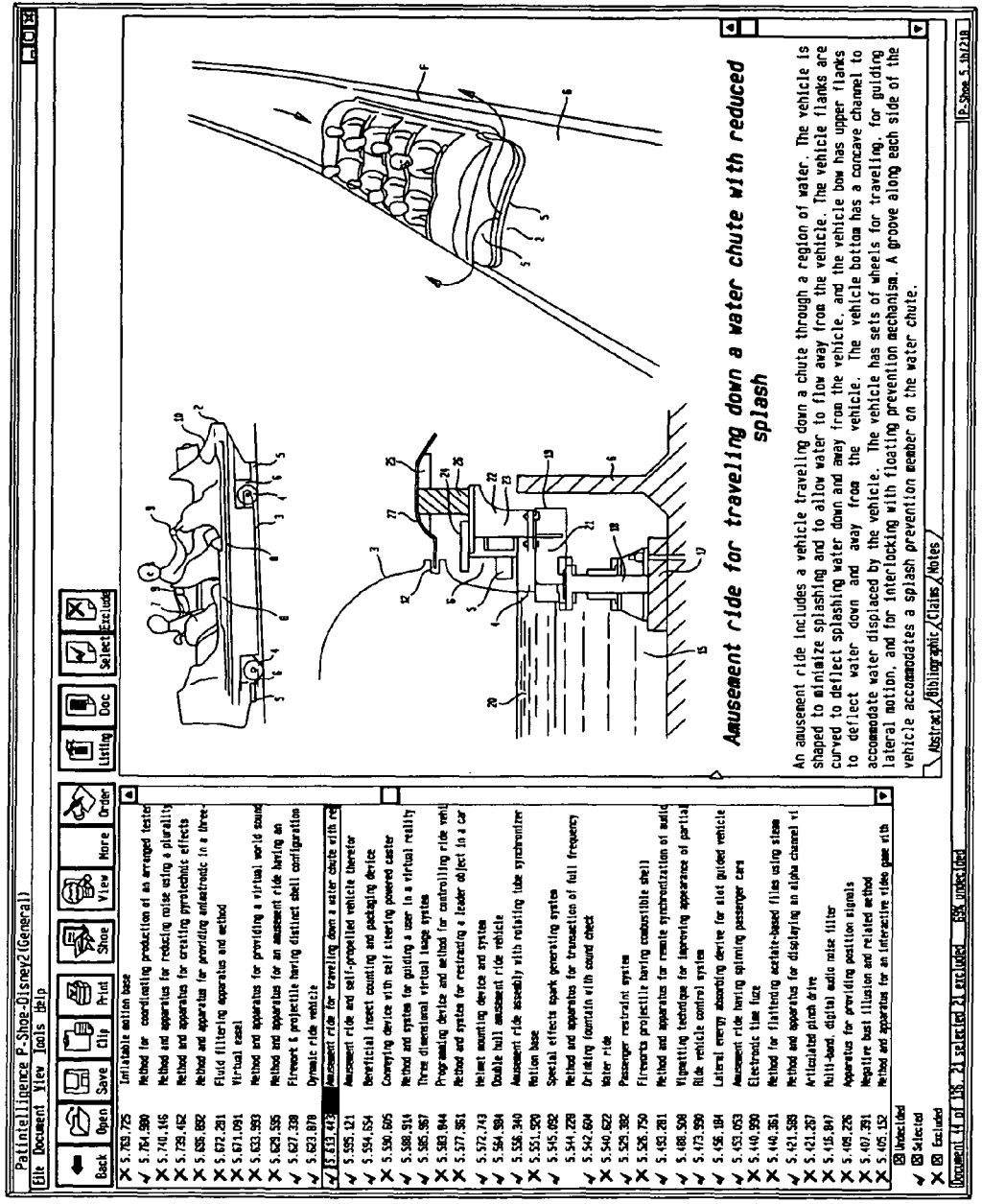
FIGS. 18 and 19 show display screens of a preferred embodiment while viewing two different sections of text.
Figure 19:
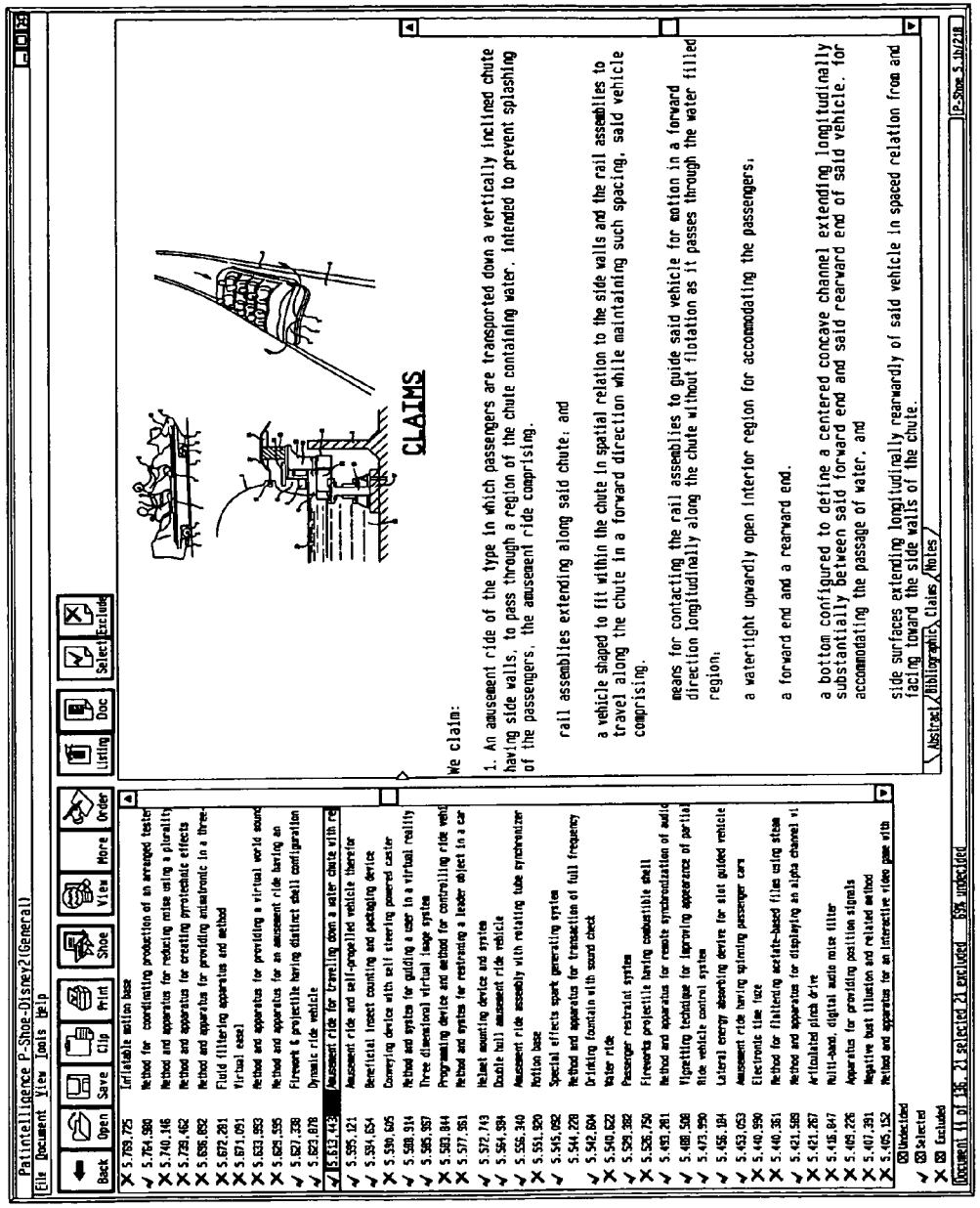

Once the document has been loaded and displayed, the user can use the tabs to easily locate a particular section of text they want to view. FIGS. 18 and 19 show display screens of the preferred embodiment while viewing two different sections of text.

Likewise, if the user decides to scroll the text using the scrollbar natively supplied by the AllText, as the user scrolls through the document sections, the corresponding tab will automatically be highlighted. This provides the user with a visual indication of what section they are in. The implementation details of this functionality with regard to the preferred embodiment will be explained hereafter.

If the user clicks on a section tab, the preferred embodiment must automatically scroll the text in the AllText to the corresponding section. This is done by trapping the TabPageShown event of the TabPro control. FIG. 15 is a flow chart that illustrates this process, and listing 5 shows the code used to accomplish this in the preferred embodiment.

---
Listing 5
---
```
Sub TabPro_TabPageShown (ActiveTab As Integer, ActivePage As Integer)
    Dim X As Long
    Dim Y As Long
    Dim Result As Long
    If SectionScrollUpdate Then
        SectionScrollUpdate = False
        Exit Sub
    End If
    AllText.WriteProtect = ATX_PROTECT_SCREEN
    AllText.Select = False
    AllText.SelStart = 0
    TabPro.Tab = ActiveTab
```
---
Listing 5
---
```
    Result = Find N_Tag(AllText, Val(TabPro.TabTag), 1)
    Result = ATX_CurToXY(AllText, AllText.CurPar, AllText.CurChar, X, Y)
    AllText.Select = 0
    AllText.ScrollVert = Y
    AllText.WriteProtect = ATX_PROTECT_CHANGES
End Sub
```
---

The preferred embodiment must first detect a tab selection event (1501). The paragraph corresponding to the selected tab is then determined (1502). The AllText control then updates the topmost paragraph to that which corresponds to the tab selection (1503).

If the user scrolls using the scrollbar inherently provided by the AllText control, then the preferred embodiment must select the tab that corresponds with the section that is currently visible on the display. FIG. 16 is a flow chart that illustrates this process, and Listing 6 provides the code used in the preferred embodiment to accomplish this task.

---
Listing 6
---
```
Sub AllText_AtxVScrollClick (ScrollVert As Long)
    Dim Index As Integer
    Dim X As Long
    Dim Y As Long
    Dim X1 As Long
    Dim Y1 As Long
    Dim Result As Integer
    Dim Paragraph As Long
    Dim C As Integer
    Dim Check As Integer
    Dim Continue As Integer
    Y = ScrollVert
    Result = ATX_XYToCur(AllText, X, Y, Paragraph, C)
    Result = ATX_CurToXY(AllText, Paragraph, C, X1, Y1)
    For Index = 0 To (SectionCount – 1)
        If (Paragraph >= SectionRange(Index)) And _
                (Paragraph < SectionRange(Index + 1)) Then
            If SectionRange(Index + 1) = 999 Then
                Continue = True
                For Check = (Index + 1) To SectionCount
                    If SectionRange(Check) < > 999 Then
                        If Paragraph >= SectionRange(Check) Then
                            Continue = False
                        End If
                        Exit For
                    End If
                Next
            Else
                Continue = True
            End If
            If Continue Then
                If Index = 0 Then
                    ScrollTab 0
                Else
                    ScrollTab Index
                End If
                Exit Sub
            End If
        End If
    Next
End Sub
Sub ScrollTab (Index As Integer)
    If TabPro.ActiveTab < > Index Then
        SectionScrollUpdate = True
        TabPro.ActiveTab = Index
    End If
End Sub
```
---

First, the preferred embodiment must determine which paragraph of AllText is the topmost visible (1601). The AllText control provides an interface for doing this.

Second, the preferred embodiment must iterate through each SectionRange to determine if the current paragraph falls within that range (1602). The SectionRange values were assigned during the document text loading phase and is described above.

Once it is determined in which SectionRange the current paragraph falls, the preferred embodiment then uses the associated SectionIndex to display the correct tab (1603).

Select and Exclude Feature

Figure 20:
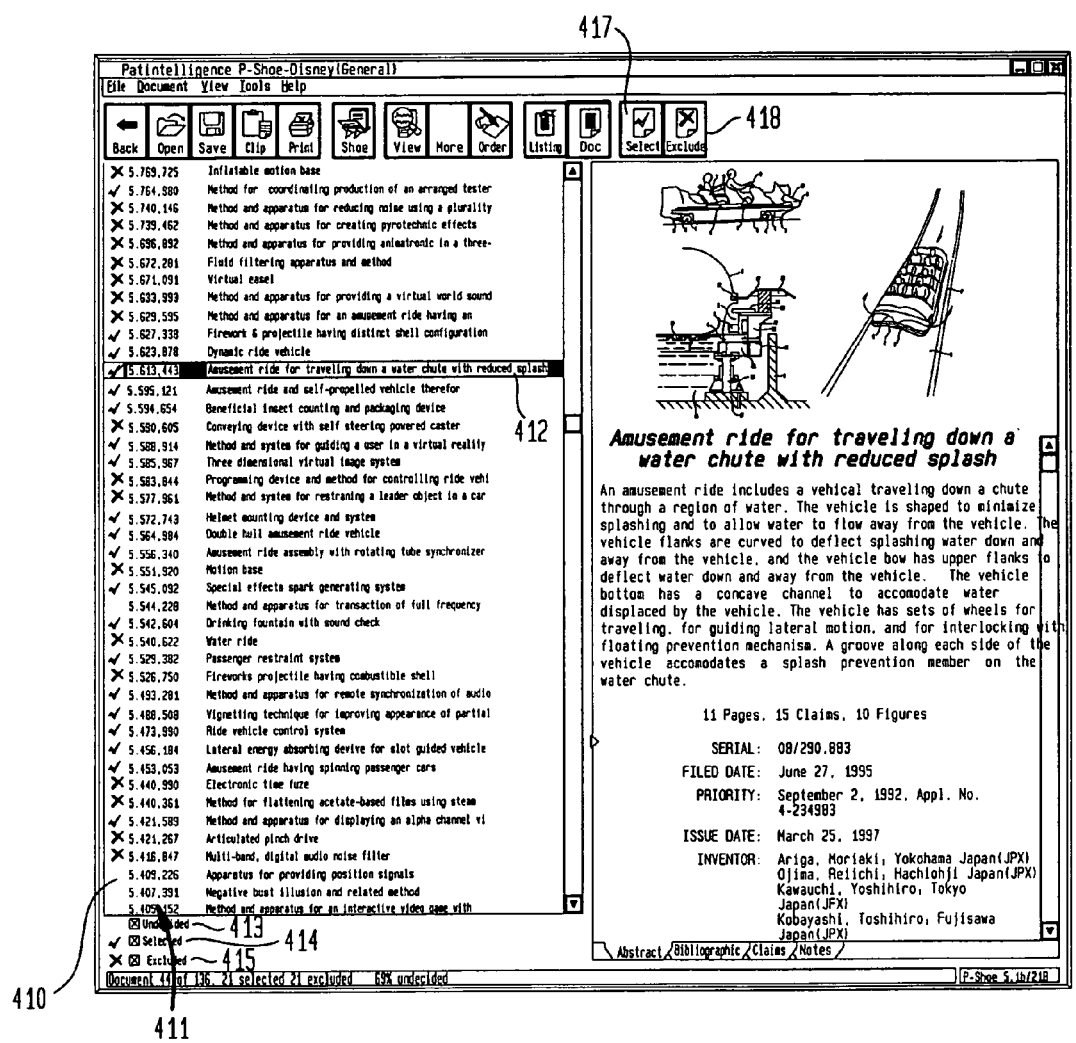
FIG. 20 shows a list of patents with selections and exclusions.

Another feature of the preferred embodiment is a document characterization input shown in FIG. 20, in the form of a button bar 417, 418, (which may also have hot-key equivalents). In the preferred embodiment, a list of documents 411 meeting certain user-defined exclusionary criteria is provided in the left-hand pane of the display. These criteria (not shown in the Figures) include, for example, patent classification, application or issuance date, Boolean text search criteria, or the like. In the case of patent documents, the pane provides a listing of each document including patent number and title. To the left of the patent number, is a column 419 showing an indicia, such as a green check mark or red cross mark. These indicia correspond, for example, to a check box 417 for "select" and a check box 418 for "exclude", respectively. The default is "undecided" (no indicia), which may have its own check box, or be controlled based on the absence of other active check boxes.

It is understood that the criteria need not be "select" or "exclude", and may in fact be other predefined or user defined criteria, as a means for segregating the document list during review by the user.

This segregation would serve as a means of "binning" the patents into categories that are meaningful to the user. For example, categories might be arbitrarily established for patents to order, patents held by competitors, patents that are marginally interesting, and patents owned or licensed by the inventor.

Further, the user may seek to categorize the patents into various mutually exclusive or overlapping relevant topics. Thus, in this case, the user may be provided with a user defined categorization tool, which may also have a set of rules associated with it. These categories may each be represented by an iconic button on a button bar, for ease of selection.

Once the patents have been selected or excluded (or binned,) the bins can be combined and manipulated using Boolean logic. A union of bins would be obtained by combining the patents in two or more bins. An intersection would be possible by logically AND-ing the bins (looking only for duplicates) in the event that a patent could be in more than one bin at a time. New bins could thereby be created from existing ones, or patents could be added to existing bins accordingly. For example, the bottom of the preferred display screen shown in FIG. 20 provides individually selectable display options 414, 415, 413 for the various categories of patents, including the excluded, selected, and undecided, respectively.

The process for performing Boolean logic on groups of items that are uniquely identified such as by a patent number is well known in the art of patent searching and programming.

A set of functions may then be applied based on the user-selected criteria, such as Print, Order (hardcopy), Save (as a list for later review or manipulation), or other function, by the Host.

In the case of a patent document review, the predefined select, exclude and undecided criteria are preferred.

The foregoing description of the preferred embodiment of the invention has been presented for purposes of illustration and description and is not intended to be exhaustive or to limit the invention to the precise forms disclosed, since many modifications and variations are possible in light of the above teachings. Some modifications have been described in the specifications, and others may occur to those skilled in the art to which the invention pertains. Therefore, the scope of the invention is to be defined solely by the claims that follow.

What is claimed is:

1. A computer implemented method for creating a data file, the method comprising:
    creating, by a computing device, the data file, wherein the data file comprises:
        a header portion containing an index portion;
        a first data type located near a terminus of the data file at a starting location referenced by the index portion, wherein the first data type is structured to be readable by a tool that ignores data in the data file after an end of file (EOF) marker in the data file, the first data type corresponding to compressed image data; and
        a second data type located between the header and the first data type, having the EOF marker at its terminus, wherein the second data type comprises a text file contextually associated with said first data type; and
        wherein the content of the data file are arranged to be compatible with Group-4 Tagged Image File Format (TIFF) specifications.

2. The computer implemented method of claim 1, wherein the second data type is structured to be processed by a standard text reader software tool that ignores data of a text file after an EOF marker in the text file.

3. The computer implemented method of claim 2, wherein data of the second data type is formatted according to a structured format of records and fields.

4. The computer implemented method of claim 3, wherein the fields include a series of ASCII characters followed by a TAB character.

5. The computer implemented method of claim 3, wherein the records include at least one field followed by an ASCII 13 character and an ASCII 10 character in series.

6. The computer implemented method of claim 3, wherein a first field of the records is a record type field that describes data contained in the records.

7. The computer implemented method of claim 1, wherein the second data type is text data and the first data type is image data, wherein the data file format enables both the text data and image data to be extracted using corresponding applications without physical parsing of the data file.

8. The computer implemented method of claim 1, wherein the second data type is text data, wherein the text data is indexed.

9. A data file tangibly embodied on a computer-readable storage medium, comprising:
    a header portion containing an index portion;
    a first data type located near a terminus of the data file at a starting location referenced by the index portion, wherein the first data type is structured to be readable by a tool that ignores data in the data file after an end of file (EOF) marker in the data file, the first data type corresponding to compressed image data; and
    a second data type located between the header and the first data type, having the EOF marker at its terminus, wherein the second data type comprises a text file contextually associated with said first data type; and
    wherein the content of the data file are arranged to be compatible with Group-4 Tagged Image File Format (TIFF) specifications.

10. The data file of claim 9, wherein a format of the second data is an industry standard format.

11. The data file of claim 9, wherein a format of the second data is a proprietary format.

12. The data file of claim 9, wherein the second data is structured to be processed by a standard text reader software tool that ignores data of a text file after an EOF marker in the text file.

13. The data file of claim 12, wherein the second data is formatted according to a structured format of records and fields.

14. The data file of claim 13, wherein a field includes a series of ASCII characters followed by a TAB character.

15. The data file of claim 13, wherein a record includes at least one field followed by an ASCII 13 character and an ASCII 10 character in series.

16. The data file of claim 13, wherein a first field of a record is a record type field that describes data contained in the record.

17. The data file of claim 9, wherein the second data is text data and the first data is image data, wherein both the text data and image data can be extracted from the data file using corresponding applications without physical parsing of the data file.

18. The data file of claim 9, wherein the second data is text data, wherein the text data is indexed.

\* \* \* \* \*

UNITED STATES PATENT AND TRADEMARK OFFICE
CERTIFICATE OF CORRECTION

| | | |
|---|---|---|
| PATENT NO. | : 7,917,838 B2 | Page 1 of 1 |
| APPLICATION NO. | : 11/513323 | |
| DATED | : March 29, 2011 | |
| INVENTOR(S) | : Young et al. | |

It is certified that error appears in the above-identified patient and that said Letters Patent is hereby corrected as shown below:

Title page, item (76), under "Inventors", in Column 1, Line 1, delete "Cory" and insert -- Corey --.

Title page, item (74), under "Attorney, Agent, or Firm", in Column 2, Line 1, delete "Golstein" and insert -- Goldstein --.

Column 1, line 10, delete "7,770,009" and insert -- 7,770,099 --.

Signed and Sealed this
Nineteenth Day of July, 2011

David J. Kappos
*Director of the United States Patent and Trademark Office*